United States Patent
Komori et al.

(10) Patent No.: US 8,469,596 B2
(45) Date of Patent: Jun. 25, 2013

(54) ELECTROFORMED BEARING AND METHOD OF MANUFACTURING SAME

(75) Inventors: Isao Komori, Kuwana (JP); Yasuhiro Yamamoto, Kuwana (JP); Kenji Hibi, Kuwana (JP)

(73) Assignee: NTN Corporation, Osaka-shi (JP)

( * ) Notice: Subject to any disclaimer, the term of this patent is extended or adjusted under 35 U.S.C. 154(b) by 626 days.

(21) Appl. No.: 12/678,192

(22) PCT Filed: Sep. 11, 2008

(86) PCT No.: PCT/JP2008/066432
§ 371 (c)(1),
(2), (4) Date: Mar. 15, 2010

(87) PCT Pub. No.: WO2009/047963
PCT Pub. Date: Apr. 16, 2009

(65) Prior Publication Data
US 2011/0216992 A1    Sep. 8, 2011

(30) Foreign Application Priority Data

Oct. 10, 2007  (JP) .................. 2007-264692
Oct. 11, 2007  (JP) .................. 2007-265631
Dec. 20, 2007  (JP) .................. 2007-329126

(51) Int. Cl.
*F16C 33/02*     (2006.01)

(52) U.S. Cl.
USPC .......................... 384/276; 384/280

(58) Field of Classification Search
USPC ............ 384/100, 107, 114, 115, 123, 625, 384/913; 264/135, 265; 205/50, 67
See application file for complete search history.

(56) References Cited

U.S. PATENT DOCUMENTS 3,595,762 A * 7/1971 Chessin .................. 205/50
4,098,654 A * 7/1978 Helle et al. .............. 205/50

FOREIGN PATENT DOCUMENTS

| JP | 3-3294 A | 1/1991 |
|----|----------|--------|
| JP | 2001-162643 A | 6/2001 |
| JP | 2003-56552 A | 2/2003 |
| JP | 2006-247972 A | 9/2006 |
| JP | 2006-342912 A | 12/2006 |
| JP | 2007-002966 A | 1/2007 |
| JP | 2007-239795 A | 9/2007 |
| JP | 2007-321966 A | 12/2007 |

OTHER PUBLICATIONS

Japanese Office Action dated Sep. 19, 2012, issued in corresponding Japanese patent application No. 2007-264692, w/ partial English translation.

Japanese Office Action dated Sep. 19, 2012, issued in corresponding Japanese patent application No. 2007-265631, w/ partial English translation.

(Continued)

*Primary Examiner* — Phillip A Johnson
(74) *Attorney, Agent, or Firm* — Westerman, Hattori, Daniels & Adrian, LLP

(57) ABSTRACT

Fine particles (6) are retained by an electroformed portion (4) in a dispersed state, and the fine particles (6) exposed from an outer peripheral surface (4*a*2) of the electroformed portion (4) are molten so as to form micro projections (60) integrated with a resin portion (5). The micro projections (60) enters into fine-particle traces (4*c*) formed in the electroformed portion (4) to exert an anchor effect, to thereby increase a fixation force between the resin portion (5) and the electroformed portion (4).

5 Claims, 11 Drawing Sheets

OTHER PUBLICATIONS

International Search Report of PCT/JP2008/066432, mailing date of Nov. 4, 2008.
Notification of Transmittal of Translation of the International Preliminary Report on Patentability (Form PCT/IB/338) of International Application No. PCT/JP2008/066432 mailed May 20, 2010 with Forms PCT/IB/373 and PCT/ISA/237.
Office Action mailed Feb. 14, 2013 in corresponding Japanese Patent Application 2007-329126.

* cited by examiner

FIG. 14a
FIG. 14b
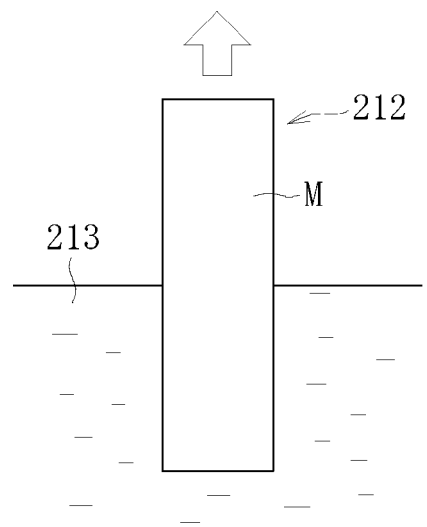
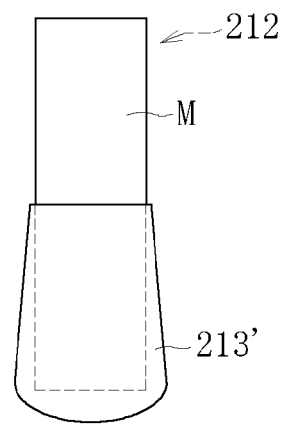
FIG. 14c
FIG. 14d
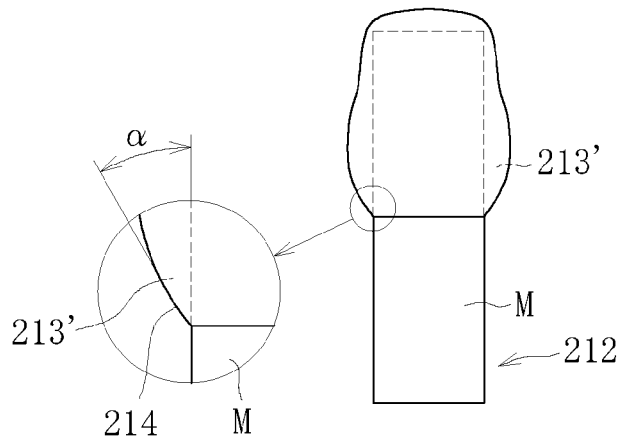
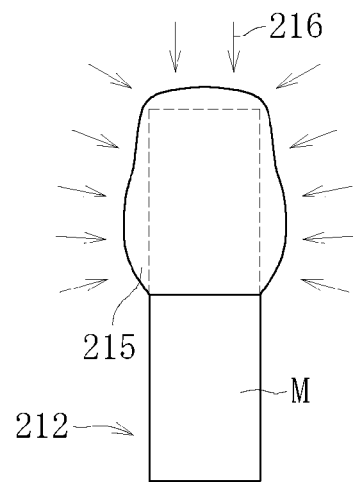

ELECTROFORMED BEARING AND METHOD OF MANUFACTURING SAME

TECHNICAL FIELD

The present invention relates to an electroformed bearing including an electroformed portion and a shaft member, in which a radial bearing clearance is formed between the electroformed portion and the shaft member.

BACKGROUND ART

For example, an electroformed bearing described in Patent Document 1 is formed by depositing metal on an outer periphery of a master shaft to form an electroformed portion, and by inserting the electroformed portion into a resin to perform injection molding with the resin.
Patent Document 1: JP 2003-56552 A

DISCLOSURE OF THE INVENTION

Problems to be Solved by the Invention

Generally, an adhesion force between a resin and metal is not large. Therefore, in an electroformed bearing which is formed by injection molding of a resin by inserting the electroformed portion as described above, a fixation force between the electroformed portion and the resin portion becomes a problem. In particular, as in an electroformed bearing described in Patent Document 1, when the outer peripheral surface of the electroformed portion and the inner peripheral surface of the resin portion are both formed into a cylindrical surface, it is necessary to take measures for increasing the fixation force therebetween. However, when the resin portion is to be formed by a material having high fixation force with respect to the electroformed portion, range of selection of the material of the resin portion becomes small, which leads to a risk that a bearing performance required for the resin portion cannot be achieved.

Further, when a sufficient engaging force is not ensured between the electroformed portion and a die-molded portion, there is a risk that, in separating a die after forming the die-molded portion and separating a master, the electroformed portion and the die-molded portion are separated from each other by a pushing force of an corresponding amount applied from an extruding mechanism such as an ejection pin to an end surface of the electroformed portion, that is, substantially an end portion of the die-molded portion, or by an impact load in the axial direction applied thereto during use. When the sufficient engaging force is not ensured between the both portions, there is a risk that a special consideration is needed at the time of manufacturing to increase a manufacturing cost, and there is also a risk that a durability life required for the bearing device cannot be ensured. Rough-surface processing may be separately performed for the purpose of increasing the engaging force between the both portions. However, the manufacturing cost inevitably increases in such case.

It is an object of the present invention to provide an electroformed bearing in which the electroformed portion and the resin portion are firmly fixed to each other.

Means for Solving the Problems

In order to achieve the above-mentioned object, the present invention provides an electroformed bearing including: an electroformed portion having an inner surface in which a bearing surface is formed; and a resin portion which is injection-molded with the electroformed portion used as an insertion component, in which the electroformed portion retains fine particles in a dispersed state, and fine particles exposed from a surface coming into contact with the resin portion of the electroformed portion are molten so as to be integrated with the resin portion.

As described above, in the electroformed bearing of the present invention, the fine particles retained by the electroformed portion and exposed from the surface coming into contact with the resin portion are molten so as to be integrated with the resin portion. As a result, recessed portions (fine-particle traces) are formed in positions where the fine particles exist of the outer surface of the electroformed portion, and the fine-particle traces are filled with the fine particles (micro projections) integrated with the resin portion. The micro projections of the resin portion, which enter in the fine-particle traces of the electroformed portion exert an anchor effect, and hence the fixation force between the resin portion and the electroformed portion can be increased.

In this case, when the fine particles and the resin portion are made of the same kind of resins, it is possible to melt the fine particles by bringing, at the time of injection molding of the resin portion, the injection material into contact with the fine particles exposed from the surface of the electroformed portion. After that, the material thus molten is cooled and solidified, and hence the fine particles and the resin portion can be integrated with each other without the need for a separate step. Note that the same kind of resins mean materials in which, of a base resin, a filler, and a combination ratio thereof, at least a kind of the base resins is the same.

The above-mentioned bearing can be manufactured in the following manner. First, the fine particles are retained by the electroformed portion in the dispersed state, and a part of the fine particles are exposed on the surface of the electro formed portion. The fine particles can be retained by the electroformed portion in the dispersed state by, for example, depositing the electroformed portion in a solution in which the fine particles are dispersed. When the electroformed portion is arranged in a cavity of a die and a material of the resin portion is injected into the cavity, the fine particles exposed on the surface of the electro formed portion are molten by the injection material. After that, the fine particles thus molten are cooled and solidified to be integrated with the resin portion, and hence the electroformed portion and the resin portion can be integrally molded.

Further, in order to achieve the above-mentioned object, the present invention provides an electroformed bearing including: a shaft member; an electro formed portion having an inner peripheral surface which is opposed to an outer peripheral surface of the shaft member through a radial bearing clearance; and a resin portion which covers the electroformed portion and is held in close contact with the electroformed portion, in which, of the resin portion, a surface coming into contact at least with the electroformed portion is provided with high-adhesion-force portions having an adhesion force with respect to the electroformed portion higher than an adhesion force of other region of the resin portion.

In this manner, by providing the high-adhesion-force portions in the surface coming into contact with the electroformed portion of the resin portion, while a high detachment resistance can be ensured between the electroformed portion and the resin portion, other region of the resin portion can be molded by a resin which satisfies a bearing performance required for the region portion, such as moldability, a low-outgassing property, and oil resistance. Therefore, it is possible to obtain both the detachment resistance and the bearing performance.

When the high-adhesion-force portions are provided randomly in a contact portion with the electroformed portion, other portion (low-adhesion-force portion) enters clearances between the high-adhesion-force portions, to thereby effect the anchor effect, and hence it is possible to further increase the detachment resistance between the electroformed portion and the resin portion.

In the material of the resin portion, a die-separation agent is contained in many cases for increasing a die-separation property from a molding die. In contrast, of the resin portion of the electroformed bearing according to the present invention, the high-adhesion-force portions provided in the contact portion with the electroformed portion are allowed not to be in contact with the molding die, and hence a content ratio of the die-separation in the high-adhesion-force portions may be set to zero or to be lower than that in other region of the resin portion. Therefore, it is possible to obtain a high adhesion property with the electroformed portion.

In such electroformed bearing, the high-adhesion-force portions are formed by, for example, distributing resins on the surface of the electroformed portion, and then other region of the resin portion may be formed by insertion molding. In this case, when the high-adhesion-force portions are formed of the same kind of resin as that of the other potion (low-adhesion-force portion) of the resin portion, the injection materials come into contact with parts of the high-adhesion-force portions, and the parts of the high-adhesion-force portions are molten and then cooled and solidified. In this manner, the resin portion can be integrated. Note that the same kind of resins mean materials in which, of a base resin, a filler, and a combination ratio thereof, at least a kind of the base resins is the same.

As described above, when the high-adhesion-force portions are molten with the injection material, there is a risk that, when the high-adhesion-force portions are completely molten and mixed with the injection material, the adhesion force of the high-adhesion-force portions with respect to the electroformed portion decreases. In this regard, by forming the high-adhesion-force portions by a material having a melting point higher than that of the low-adhesion-force portion, it is possible to avoid a situation in which the high-adhesion-force portions are molten by the injection material of the low-adhesion-force portion. Further, by forming the high-adhesion-force portions by a resin having a melting point higher than the temperature of injecting the material of the low-adhesion-force portion, the above-mentioned trouble can be more reliably avoided.

Further, in order to achieve the above-mentioned object, the present invention provides an electroformed bearing including: an electroformed portion having a bearing surface in the inner periphery thereof; and a die-molded portion which is die-molded with the electroformed portion being inserted thereinto, in which the electroformed portion has, in an outer periphery at one end thereof, a decreased-diameter surface whose radial dimension is gradually decreased toward the one end. Note that the electroformed portion in this case includes, in addition to one formed by a method conforming to electrolytic plating, one formed by a method conforming to nonelectrolytic plating.

In the above-mentioned manner, when the decreased-diameter surface whose radial dimension is gradually decreased toward the one end is formed along the outer periphery at one end of the electroformed portion, the die-molded portion is integrally die-molded so as to face the decreased-diameter surface of the outer peripheral surface of the electroformed portion to be inserted. Therefore, even when the pushing force in the axial direction is applied to the die-molded portion at the time of die separation and master separation, or even when the impact load in the axial direction is applied thereto during use, the electroformed portion and the die-molded portion engage with each other in the axial direction, and hence the relative movement in the axial direction of the electroformed portion and the die-molded portion is restricted. As a result, the engaging force between the electroformed portion and the die-molded portion is increased, and hence it is possible to effectively prevent separation between the electroformed portion and the die-molded portion.

In the inner periphery at the one end of the electroformed portion, an increased-diameter surface whose radial dimension is gradually increased toward the one end may be formed. The increased-diameter surface can be used as a guiding surface when a shaft is inserted along the inner periphery of the electroformed bearing. In addition, particularly when the electroformed bearing is used in the fluid dynamic bearing device, the increased-diameter surface can form a space having a tapered shape between itself and the shaft inserted along the inner periphery of the electroformed bearing. The space having the tapered shape can be used not only as a tapered seal portion provided for the purpose of preventing leakage of lubricating fluid (for example, lubricating oil) filling the interior of the bearing, but also as an oil pool for supplying the lubricating oil to the bearing clearance.

Surface texture of the increased-diameter surface may be different from surface texture of the bearing surface. Such configuration can be obtained, as described later, by constituting the increased-diameter surface by a separation surface from a masking portion provided on the surface of the master while constituting the bearing surface by a separation surface from the master. Patent Document 1 describes that, along with deposition and formation of the electroformed portion, a tapered surface (increased-diameter surface) is naturally formed along the inner periphery at the end portion of the electroformed portion. However, in this method, there is a difficulty in forming the increased-diameter surface with high accuracy, and, in particular, a difficulty in performing appropriate oil amount management when it is assumed that the increased-diameter surface of the electroformed portion is used as one surface forming the seal portion and the oil pool. Therefore, this method is not preferred. In contrast, in the above-mentioned configuration according to the present invention, one end of the masking portion is formed as an increased-diameter surface with high accuracy, and, in particular, hence the increased-diameter surface of the electroformed portion becomes highly accurate so as to correspond thereto. As a result, the oil amount management and the like can be performed appropriately, and hence the configuration according to the present invention is desirable.

Further, in order to achieve another object described above, the present invention provides a method of manufacturing an electroformed bearing including: an electroformed portion having a bearing surface in an inner periphery thereof; and a die-molded portion which is die-molded with the electroformed portion being inserted thereinto. In the method of manufacturing the electroformed bearing, a masking portion having, along the outer periphery at one end thereof, an increased-diameter surface whose radial dimension is gradually increased toward the direction of pulling out the master is provided on the master surface serving as a base material for forming the electroformed portion, and the electroformed portion is deposited and formed along the increased-diameter surface of the masking portion. As a result, a decreased-diameter surface whose radial dimension is gradually decreased toward the one end of the electroformed portion is formed along the outer periphery at one end of the electroformed portion, and the increased-diameter surface whose radial dimension is gradually increased toward the one end of the electro formed portion is formed along the inner periphery at the one end of the electro formed portion.

By thus forming the above-mentioned decreased-diameter surface along the outer periphery at the one end of the electroformed portion at the time of deposition and formation of the electroformed portion, engagement strength between the electroformed portion and the die-molded portion can be increased while avoiding increase in manufacturing cost due to increase of the number of steps. Further, because the above-mentioned increased-diameter surface is formed along the inner periphery at the one end of the electroformed portion simultaneously with formation of the decreased-diameter surface, it is possible to obtain the electroformed bearing capable of exerting the above-mentioned action and effect at low cost.

When the electroformed portion is formed in the above-mentioned manner, if the inclined angle of the increased-diameter surface of the masking portion with respect to the outer peripheral surface of the master (strictly, outer peripheral surface of the master to which the masking portion is adhered) is smaller than 15°, strength of the one end of the masking portion becomes insufficient, which leads to a risk that the masking portion remains on the inner periphery of the increased-diameter surface of the electroformed portion. On the other hand, if the inclined angle of the increased-diameter surface is larger than 60°, there is a risk that the decreased-diameter surface cannot be formed along the outer periphery at the one end of the electroformed portion. Therefore, it is preferred that the inclined angle of the tapered surface of the masking portion with respect to the outer peripheral surface of the master be set to 15° or more and 60° or less.

It is preferred that the masking portion to be provided on the master surface be one which can be formed and eliminated by an as easiest means as possible in view of reducing the manufacturing cost of the electroformed bearing (electroformed portion). For example, a nonconductor tube having the enlarged diameter-surface along the outer periphery at one end thereof may be press-fitted into the master. However, when the nonconductor tube is press-fitted, the inner periphery at the one end of the nonconductor tube is caught on the inner peripheral side of the nonconductor tube due to press-fitting resistance, and a fine clearance is formed between the nonconductor tube and the master in some cases. When the electroforming is performed in the state in which such clearance exists, a burr is formed at the one end of the electroformed portion, and hence there arises a need for separately eliminating this burr, which leads to a risk of rather increasing the manufacturing cost. Further, it is not easy to eliminate the press-fitted conductor tube without damaging the completed electroformed portion after the electroforming when eliminating (detaching) the nonconductor tube before molding of the die-molded portion.

In this regard, in the present invention, the masking portion of the above-mentioned mode is formed by adhering the masking material on the master surface by dipping before reversing the master, and then curing the masking material at the point in time when the adhered masking material becomes a predetermined shape. In this method, a surface layer portion of the masking material adhered on the master surface flows, and the masking portion is formed into a predetermined shape. Therefore, a clearance is not formed between the masking portion and the master at the time of formation of the masking portion. Therefore, it is possible to effectively solve the above-mentioned problem of burr generation. Further, the masking portion formed in the above-mentioned manner can be eliminated by, for example, immersing the masking portion into a solvent to swell the masking portion, an hence it is possible to effectively avoid the electroformed portion from being damaged at the time of elimination of the masking portion.

As the masking material, it is possible to use resins having various curing characteristics, such as one having a thermosetting characteristic cured by being heated (thermosetting type) and one having a photo-curing characteristic which is cured by being irradiated with light (photo-curing type). In order to form the masking portion having the predetermined shape by the above-mentioned procedure, it is necessary to quickly cure the masking material at the point in time when the adhered masking material becomes a predetermined shape. Therefore, it is preferred that the masking material have an excellent curing speed, and the photo-curing type cured by being irradiated with light is desirable. The photo-curing type masking material is classified into a ultraviolet-curing type, an infrared-curing type, and a visible-light-curing type. Of those, the ultraviolet-curing type, which has a particularly excellent curing speed and costs less, is desirable. Further, in the masking material of the photo-curing type, curing is started from the portion irradiated with light, that is, the surface layer portion of the masking material adhered to the master, and hence it is possible to prevent deterioration in shape of the masking portion as much as possible. Therefore, the photo-curing type is desirable also in view of accurately forming the masking portion of a predetermined shape.

Further, when the masking portion is formed in the above-mentioned mode, when the masking portion has low viscosity, it is difficult to ensure thickness of the masking portion. In addition, during a period of time after the master is reversed and the masking material becomes a predetermined shape until the surface layer portion of the masking material is cured, it is difficult to retain the masking material in the predetermined shape. On the other hand, when the masking material has high viscosity, the masking material does not flow after the master is reversed, and hence it is difficult to form the masking portion, in particular, the one end thereof into a predetermined shape. The inventors of the subject application devoted themselves to investigation to find out that it is possible to avoid the above-mentioned problem by using the masking material having viscosity of 5 Pa·s or more and 12 Pa·s or less.

The electroformed bearing described above can suitably constitute a fluid dynamic bearing device or a sliding bearing device in which a shaft member is inserted along the inner periphery thereof to support the shaft so as to make a relative rotation.

Effects of the Invention

As described above, according to the present invention, it is possible to obtain the electroformed bearing in which the electroformed portion and the resin portion are firmly fixed to each other.

BEST MODE FOR CARRYING OUT THE INVENTION

Hereinafter, a first embodiment of the present invention is described with reference to the drawings.

FIG. 1 is a view conceptually illustrating an example of a motor incorporating an electroformed bearing 1 according to an embodiment of the present invention. This motor is a fan motor incorporated in a personal computer or the like to be used for cooling of a heat generating source. The fan motor includes a bearing device 1 rotatably supporting a shaft member 2, a rotor 31, which is provided integrally or separately to the shaft member 2 and integrally includes a fan 35, a stator coil 32 and a rotor magnet 33, which are opposed to each other through, for example, a radial gap, and a bracket 34. The stator coil 32 is attached to the outer periphery of the bracket 34, and the rotor magnet 33 is attached to the inner periphery of the rotor 31. When the stator coil 32 is energized, the rotor magnet 33 is rotated by an electromagnetic force between the stator coil 32 and the rotor magnet 33. As a result, the rotor 31 and the fan 35 rotate together with the shaft member 2 to generate air current, to thereby cool the heat generating source.

The bearing device 1 illustrated in FIG. 2 includes, as main components, the shaft member 2 and the bearing member 3 having the inner periphery along which the shaft member 2 is inserted.

The bearing member 3 is formed into a bottomed cylindrical shape including an electroformed portion 4 and a resin portion 5, the electroformed portion 4 being formed by depositing metal ion such as nickel and copper on a master surface by electroforming, the resin portion 5 being injection-molded with the electroformed portion 4 being inserted thereinto.

The electroformed portion 4 is formed through the deposition of a metal such as nickel, and is formed into a bottomed cylindrical shape including a side portion 4a and a bottom portion 4b. An inner peripheral surface 4a1 of the side portion 4a of the electroformed portion 4 has dynamic pressure generating grooves 4a11 and 4a12 formed to be arranged at two portions separated from each other in the axial direction in a herringbone pattern. An upper end surface 4b1 of the bottom portion 4b of the electroformed portion 4 is formed into a flat surface without concavities and convexities. Further, as illustrated in FIG. 2 in an enlarged manner, the electroformed portion 4 retains fine particles 6 in a dispersed state inside thereof, and has fine-particle traces 4c in an outer peripheral surface 4a2 and a lower end surface 4b2 of the bottom portion 4b, that is, a surface coming into contact with the resin portion 5.

The resin portion 5 integrally includes a base portion 50 retaining the electroformed portion 4 from the outer periphery and the lower side, and an infinite number of micro projections 60 protruding toward the electroformed portion 4. The micro projections 60 of the resin portion 5 enter the fine-particle traces 4c of the electroformed portion 4. As a result, the inside of the fine-particle traces 4c is filled with the micro projections 60.

The shaft member 2 is formed of a metal to have a constant diameter, and a spherical protruding portion 2b is formed at the lower end thereof. When the shaft member 2 is rotated, a radial bearing clearance is formed between an outer peripheral surface 2a of the shaft member 2 and the inner peripheral surface 4a1 of the electroformed portion 4. When the dynamic pressure generating grooves 4a11 and 4a12 cause dynamic pressure action on lubricating fluid (for example, lubricating oil) in the radial bearing clearance, radial bearing portions R1 and R2 supporting the shaft member 2 in the radial direction are formed. Further, when the tip end portion of the spherical protruding portion 2b of the lower end of the shaft member 2 and the upper end surface 4b1 of the bottom portion 4b of the electroformed portion 4 come into contact with each other, a pivot bearing is constituted. As a result, a thrust bearing portion T supporting the shaft member 2 in the thrust direction is formed.

Hereinbelow, an example of a manufacturing process of the bearing member 3 is described with reference to the drawings.

The bearing member 3 is manufactured through the following steps in the stated order: step of depositing and forming the electroformed portion 4 serving as an electroformed shell on an outer surface of a master shaft 20 (electroforming step); step of die-molding the resin portion 5 with the electroformed portion and the master shaft 20 used as insertion components (insertion-molding step); and step of separating the electroformed portion 4 and the master shaft 20 (separation step).

FIG. 3 conceptually illustrates an example of the electroforming step. In an electrolyte solution 11 filling a tub 10, the master shaft (negative electrode) 20 to be subjected to electroforming and a positive electrode 12 are provided. The master shaft 20 and the positive electrode 12 are electrically connected to an electrical-power-supplying portion 13 through an electrical wire and the like. From the electrical-power-supplying portion 13, a predetermined voltage is applied between both the electrodes 20 and 12.

The master shaft 20 as a molding master of the electroformed portion 4 is formed of, for example, quenched stainless steel. In this embodiment, an outer peripheral surface 20a of the master shaft 20 is formed into a cylindrical surface shape. Of the outer peripheral surface 20a, in regions corresponding to hill portions of the dynamic pressure generating grooves 4a11 and 4a12 formed in the inner peripheral surface 4a1 of the electroformed portion 4, recessed portions 20a1 and 20a2 are formed (see FIG. 4). A material for the master shaft 20 is not limited to the stainless steel, and it is possible to select any material regardless of metal and nonmetal as long as the material has a masking property, electrical conductivity, and chemical resistance like chromium-based alloy and nickel-based alloy.

Accuracy of the outer peripheral surface of the master shaft 20 directly affects surface accuracy of the inner peripheral surface 4a1 of the electroformed portion 4 serving as a radial bearing surface for the shaft member 3, and hence it is desirable to finish the outer peripheral surface of the master shaft 20 to be accurate as much as possible.

As illustrated in FIG. 3, in a part other than a region in which the electroformed portion 4 is to be formed of the outer peripheral surface 20a of the master shaft 20, a non-conductive masking portion 14 is formed in advance. As a material for forming the masking portion 14, a material having non-conductivity and corrosion resistance with respect to the electrolyte solution is selectively used.

As the electrolyte solution 11, solution containing metal (for example, nickel ion) becoming a material for depositing the electroformed portion 4 is used. The kind of metal for deposition is appropriately selected depending on required properties such as hardness and oil resistance required for the inner peripheral surface 4a1 of the electroformed portion 4 serving as the radial bearing surface. Further, in the electrolyte solution 11, the fine particles 6 made of the same kind of resin as a material of the resin portion 5 of the bearing member 3 are dispersed (see an enlarged view of FIG. 3). Further, the electrolyte solution 11 may contain a sliding material such as carbon or a stress-alleviating material such as saccharin as required.

The positive electrode 12 is a plate-like member having a shape in which a surface opposed to the outer peripheral surface 20a of the master shaft 20 is made similar to the outer peripheral surface 20a (circular-arc cross-sectional shape), and a plurality of positive electrodes 12 are arranged around the master shaft 20 serving as a negative electrode at equal intervals (for example, four negative electrodes are arranged at intervals of 90°). In this state, a direct current is applied from the electrical-power-supplying portion 13 to the master shaft (negative electrode) 20 and the positive electrodes 12, to thereby conduct electrical power to the electrolyte solution 11 between both the electrodes 20 and 12. As a result, the ionized metal is deposited in the region other than the masking portion 14 of the outer peripheral surface 20a of the master shaft 20, and an integrated product of the electroformed portion 4 and the master shaft 20 as illustrated in FIG. 4 is formed. In this time, the electroformed portion 4 is deposited so as to follow the recessed portions 20a1 and 20a2 formed in the outer peripheral surface 20a of the master shaft 20, and hence the dynamic pressure generating grooves 4a11 and 4a12 are formed in the inner peripheral surface 4a1 of the electroformed portion 4.

Further, by dispersing the fine particles 6 in the solution 11, the fine particles 6 are retained in the dispersed state in the inside of the electroformed portion 4 simultaneously with the deposition of the electroformed portion 4. Specifically, some of the fine particles 6 are completely incorporated in the inside of the electroformed portion 4 (indicated by 6(A) in FIG. 4 in an enlarged manner), other fine particles 6 are exposed from an outer surface (outer peripheral surface 4a2 and lower end surface 4b2 of the bottom portion 4b) of the electroformed portion 4 (indicated by 6(B) in the enlarged view of FIG. 4). Note that, when the fine particles 6 are excessively large, it is difficult to retain the fine particles 6 by the electroformed portion 4 simultaneously with the deposition of the electroformed portion 4. Therefore, it is preferred to set the particle diameter of the fine particles 6 to be a size allowed to be retained in the electroformed portion 4.

The master shaft 20 having the outer periphery provided with the electroformed portion 4 (hereinafter, referred to as electroformed shaft 15) manufactured through the above-mentioned steps is provided and arranged as an insertion component in a die for injection-molding the resin portion 5.

FIG. 5 conceptually illustrates an insertion-molding step of the resin portion 5. The die used for this molding step includes a movable die 16 and a stationary die 17. The stationary die 17 is provided with a sprue, a runner (both of which are not shown), and a gate 18. In the state in which the electroformed shaft 15 is fixed to the movable die 16, the movable die 16 is caused to approach the stationary die 17, and then both the dies 16 and 17 are clamped. As a result, a cavity 19 is formed in the inside of both the dies 16 and 17. Further, of both the dies 16 and 17, a die in which the insertion-molded product remains at the time of die opening (in this case, movable die 16) is provided with an ejection mechanism for extruding and discharging the molded product to the outside of the die. In this embodiment, as the ejection mechanism, a plurality of extrusion pins 21 constituted so as to be capable of making a relative movement with respect to the movable die 16 in the axial direction are provided. Note that the gate 18 is a dot-like gate in this embodiment. For example, of the stationary die 17, the gate 18 is formed at a position corresponding to the bottom center of the resin portion 5. The area of the gate 18 is set to a proper value according to viscosity of a molten resin filling the die and the shape of the molded product.

As the material for the resin portion 5, that is, the resin injected into the cavity 19, there may be used, for example, an amorphous resin such as polysulfone (PSF), polyethersulfone (PES), polyphenylsulfone (PPSU), or polyetherimide (PEI), or a crystalline resin such as a liquid crystal polymer (LCP), polyether ether ketone (PEEK), polybutylene terephthalate (PBT), or polyphenylene sulfide (PPS), as a base resin. Of course, those are merely examples and it is possible to select the arbitrary resin as long as the material fits the usage and the use environment of the bearing. If required, it is also possible to use a material obtained by mixing a plurality of the above-mentioned resins or resins other than the above. Further, by adding, in the resin, various fillers such as a reinforcement material (form thereof is not limited; any form such as fibrous form and powdery form may be employed), lubricant, and conducting agent, it is also possible to improve properties thereof.

In the die having the above-mentioned structure, the movable die 16 is caused to approach the stationary die 17 while the electroformed shaft 15 is inserted into a predetermined positioned, to thereby perform clamping. Next, in the clamped state, the molten resin is injected and filled in the cavity 19 through the sprue, the runner, and the gate 18, to thereby integrally mold the resin portion 5 together with the electroformed shaft 15. As a result, the resin portion 5 covering the outer surface of the electroformed portion 4 is formed.

In this time, the fine particles 6(B) exposed from the surface of the electroformed portion 4 are made of the same kind of material as the injection material of the resin portion 5. Therefore, the fine particles 6(B) are partially or entirely molten by coming into contact with the molten injection material. After that, when the molten resin is cooled and solidified, the fine particles 6(B) are integrated with the resin portion 5. As illustrated in the enlarged view of FIG. 2, the infinite number of micro projections 60 protruding from the base portion 50 of the resin portion 5 toward the electroformed portion 4 are formed. The micro projections 60 exert an anchor effect by entering into the fine-particle traces 4c formed on the outer surface of the electroformed portion 4, to thereby improve a fixation force between the electroformed portion 4 and the resin portion 5. In particular, of the fine particles 6(B) exposed on the surface of the electroformed portion 4, the micro projections 60 (indicated by 60(C) in the enlarged view of FIG. 2) obtained by integration of the resin portion 5 and the fine particles each having a more than half part retained by the electroformed portion 4 (indicated by 6(B)1 in the enlarged view of FIG. 4) exert the excellent anchor effect, to thereby largely contribute to improvement of the fixation force between the electroformed portion 4 and the resin portion 5.

After molding, die opening is performed, and the molded product in which the master shaft 20, the electroformed portion 4, and the resin portion 5 are integrated is released from the movable die 16. Specifically, after the die opening, the extrusion pins 21 of the ejection mechanism provided in one (movable die 16 in this case) of the dies are extruded toward the cavity 19, to thereby discharge the molded product from the movable die 16.

The thus released molded product is, in the subsequent separation step, separated into the master shaft 20 and the bearing member 3 (see FIG. 2) including the electroformed portion 4 and the resin portion 5. In this separation step, by applying impact, for example, to the master shaft 20, the electroformed portion 4, or the resin portion 5, the inner peripheral surface 4a1 of the electroformed portion 4 is separated from the outer peripheral surface 20a of the master shaft 20. As a result, the master shaft 20 is pulled out from the electroformed portion 4 and the resin portion 5, to thereby provide the bearing member 3.

In the present invention, as described above, the fine particles 6 (micro projections 60) integrated with the resin portion 5 exert the anchor effect between the electroformed portion 4 and the resin portion 5 so as to firmly fix the electroformed portion 4 and the resin portion 5. Therefore, it is possible to avoid risk that the electroformed portion 4 and the resin portion 5 are separated from each other when separating the master shaft 20 and the bearing member 3 from each other. In particular, as in this embodiment, when the dynamic pressure generating grooves 4a11 and 4a12 are formed in the inner peripheral surface 4a1 of the electroformed portion 4 by the recessed portions 20a1 and 20a2 formed in the outer peripheral surface 20a of the master shaft 20, there is a risk that, in the separation step, the recessed portions 20a1 and 20a2 and the hill portions of the dynamic pressure generating grooves 4a11 and 4a12 engage with each other in the axial direction to apply large load for separating the fixation surfaces between the electroformed portion 4 and the resin portion 5. In such case, it is particularly effective to increase the fixation force between the electroformed portion and the resin portion 5 according to the present invention.

The separation means for the electroformed portion 4 is not limited to the above-mentioned means. For example, it is also possible to use a method by heating or cooling the electroformed portion 4 and the master shaft 20 so as to generate a difference in thermal expansion amount therebetween, or a combined means of those means. Further, the separation step may be performed simultaneously with die separation of the molded product by the ejection mechanism.

The shaft member 2 provided with, for example, the rotor 31 is inserted along the inner periphery of the bearing member 3 formed as in the above-mentioned manner, and the lubricating oil is poured in the interior space of the bearing including the radial clearance between the outer peripheral surface 2a of the shaft member 2 and the inner peripheral surface 4a1 of the electroformed portion 4 from the side opened to the atmosphere (one-end-opening side). With this, the bearing device (electroformed bearing) 1 whose interior space is filled with the lubricating oil is completed.

The present invention is not limited to the above-mentioned embodiment. Hereinafter, another embodiment of the present invention is described. Note that, in the following description, portions having the same structure and function as those in the above-mentioned embodiment are denoted by the same reference symbols and descriptions thereof are omitted.

In the above-mentioned embodiment, the fine particles 6 are made of the same kind of material as that of the resin portion 5. However, the material thereof is not limited to this, and the fine particles 6 and the resin portion 5 may be made of the different kinds of materials. For example, when the fine particles 6 are made of a material whose melting point is lower than that of the material of the resin portion 5, it is possible to reliably melt the fine particles 6 due to contact of the resin portion 5 with the injection material.

Further, in the above-mentioned embodiment, as the forming method for the electroformed portion 4, there is exemplified a method by energizing the electrolyte solution 11, that is, the so-called electrolytic plating. However, the forming method is not limited thereto. For example, it is also possible to adopt the so-called nonelectrolytic plating in which the master shaft is immersed in a solution containing object metal and the electroformed portion 4 is deposited by chemical reaction of the substance in the solution.

Further, in the above-mentioned embodiment, the electroformed portion 4 is constituted by one layer. However, other than that, the electroformed portion 4 may be constituted by, for example, a plurality of layers. In the example illustrated in FIG. 6, the electroformed portion 4 is constituted by two layers of an electroformed layer 41 on the inner side and an electroformed layer 42 on the outer side. In this case, it is sufficient that, of the electroformed portion 4, the fine particles 6 are retained in the dispersed state at least in the electroformed layer 42 on the outer side coming into contact with the resin portion 5. The fine particles 6 are exposed from the outer surface of the electroformed layer 42 on the outer side so as to be integrated with the resin portion 5. As a result, it is possible to obtain the same effect as the above-mentioned embodiment. In this manner, when the electroformed portion 4 is constituted by the plurality of layers, and the fine particles 6 are retained in the dispersed state only in the electroformed layer (in FIG. 6, the electroformed layer 42 on the outer side) coming into contact with the resin portion 5, it is possible to reduce the use mount of the fine particles 6 while maintaining density of the fine particles 6 which are exposed on the outer surface of the electroformed portion 4 to contribute to the improvement in fixation force with the resin portions. Therefore, it is possible to reduce the material cost.

Further, when the electroformed portion 4 is formed of the plurality of layers as illustrated in FIG. 6, the electroformed layers may be formed by the same method. Alternatively, the electroformed layers may be respectively formed by different methods such as electrolytic plating and nonelectrolytic plating. Generally, when the electroformed portion is formed by electrolytic plating, the formation speed is high but the hardness of the electroformed portion is not so high. On the other hand, when the electroformed portion is formed by the nonelectrolytic plating, the formation speed is low, but the electroformed portion having high hardness can be obtained. Therefore, if the electroformed layer 41 on the inner side coming into contact with the shaft member 2 is formed by the nonelectrolytic plating because the electroformed layer 41 is required to have high hardness, and the electroformed layer 42 on the outer side which is not required to have such high hardness is formed by the electrolytic plating, it is possible to efficiently manufacture the electroformed portion having the bearing surface of the high hardness.

Further, in the embodiment illustrated in FIG. 6, the fine particles 6 are retained in the dispersed state only in the electroformed layer 42 on the outer side. However, other than that, the fine particles may be retained in the dispersed state in the electroformed layer 41 on the inner side (illustration thereof is omitted). With this, the fine particles exposed from the outer surface of the electroformed portion on the inner side bite in the inner surface of the electroformed layer on the outer side, and the fine particles exert the anchor effect between the inner and outer electroformed layers. Therefore, it is possible to improve fixation force therebetween.

Further, in the above-mentioned embodiment, the bearing member 3 has a bottomed cylindrical shape. However, other than that, it is also possible to use, for example, the bearing member 3 opening on the both sides in the axial direction as illustrated in FIG. 7. In this case, it is possible to use a master shaft for forming the electroformed portion 4 as the shaft member 2. In this case, a clearance formed when the electroformed portion 4 is striped from the shaft member 2 as the master shaft is used as the bearing clearance, and hence it is possible to set the bearing clearance with high accuracy. For example, when the master shaft and the bearing member are formed separately from each other similarly to the above-mentioned embodiment, it is possible to repeatedly use the same master shaft. Therefore, by processing the master shaft with high accuracy, it is possible to make quality of each product uniform.

Further, in the above-mentioned embodiment, as the radial dynamic pressure generating portions for generating the dynamic pressure action on the lubricating fluid in the bearing clearance between the radial bearing portion R1 and R2, the dynamic pressure generating grooves 4a11 and 4a12 in the herringbone pattern are formed. However, other than that, the dynamic pressure generating grooves of the spiral pattern, a step bearing, or a multi-arc bearing may be adopted. Alternatively, it is also possible to constitute a cylindrical bearing in which the dynamic pressure generating portions are not provided and both the outer peripheral surface 2a of the shaft member 2 and the inner peripheral surface 4a1 of the electroformed portion 4 are formed into the cylindrical surface. In particular, as the step bearing, the multi-arc bearing, or the cylindrical bearing, as long as the cross-sectional shape of the outer peripheral surface 2a of the shaft member 2 and the inner peripheral surface 4a1 of the electroformed portion 4 are constant in the axial direction, the outer peripheral surface of the master shaft and the inner peripheral surface 4a1 of the electroformed portion 4 does not engage with each other when separating the master shaft from the bearing. Therefore, it is possible to more reliably avoid separation between the electroformed portion 4 and the resin portion 5.

Further, in the above, the thrust bearing portion T is constituted by the pivot bearing. However, other than that, as the thrust dynamic pressure generating portion, it is also possible to form, in the inner bottom surface 4b1 of the electroformed portion 4, dynamic pressure generating grooves in a spiral pattern or the herringbone pattern, the step bearing, a corrugated bearing (bearing changed from the step shape into the corrugated shape), or the like. The thrust dynamic pressure generating portion generates the dynamic pressure action on the lubricating fluid in the thrust bearing clearance between the inner bottom surface 4b1 of the electroformed portion 4 and the end surface of the shaft member 2, to thereby form the thrust bearing portion (illustration thereof is omitted).

Further, in the above, the dynamic pressure generating portion is formed in the inner peripheral surface 4a1 or the inner bottom surface 4b1 of the electroformed portion 4. However, the dynamic pressure generating portion may be provided in a surface opposed to the inner peripheral surface 4a1 or the inner bottom surface 4b1 through the bearing clearance, that is, the outer peripheral surface 2a of the shaft member 2 or the lower end surface thereof.

Further, in the above-mentioned embodiment, the radial bearing portions R1 and R2 are provided so as to be separated away from each other in the axial direction. However, the radial bearing portions R1 and R2 may be provided continuously in the axial direction. Alternatively, only one of the radial bearing portions R1 and R2 may be provided.

Further, in the above-mentioned embodiment, as a fluid filling the inside of the bearing device 1 to generate the dynamic pressure action in the radial bearing clearances and the thrust bearing clearance, the lubricating oil is exemplified. However, other than the lubricating oil, it is also possible to use a fluid capable of generating dynamic pressure action in the bearing clearances such as gas like the air, a magnetic fluid, and a lubricating grease.

Further, though the electroformed bearing of the present invention is used for supporting a rotational shaft of a fan motor in the above-mentioned embodiment, the electroformed bearing is not limited to that use. For example, the electroformed bearing may be used for supporting a rotational shaft of a small motor for an information device required to have high rotation accuracy, such as a spindle motor for driving a magnetic disk such as an HDD, a spindle motor for driving an optical disk or a magneto-optical disk, a polygon scanner motor of a laser beam printer, or the like. Further, the electroformed bearing of the present invention is applicable to any one of a sliding bearing for supporting relative linear sliding with the shaft, a bearing for sliding rotation for supporting both the relative sliding and the relative rotation, and a bearing for oscillation for supporting three-dimensional movement of the shaft.

Hereinafter, a second embodiment of the present invention is described with reference to the drawings.

FIG. 8 illustrates a bearing device (electroformed bearing) 101. The bearing device 101 includes, as main components, a shaft member 102 and a bearing member 103, which has an inner periphery along which the shaft member 102 is inserted, and is constituted by an electroformed portion 104 and a resin portion 105.

The electroformed portion 104 is formed by depositing a metal such as nickel, and is formed into a bottomed cylindrical shape constituted by a side portion 104a and a bottom portion 104b. In an inner peripheral surface 104a1 of the side portion 104a of the electroformed portion 104, dynamic pressure generating grooves 104a11 and 104a12 arrayed in herringbone patterns at two positions separated from each other in the axial direction are formed (indicated by doted lines in FIG. 8). An upper end surface 104b1 of the bottom portion 104b of the electroformed portion 104 is formed into a flat surface without concavities and convexities.

A resin portion 105 covers the outer surface (which means an outer peripheral surface 104a2 of the side portion 104a and a lower end surface 104b2 of the bottom portion 104b: the same holds true for the following description) of the electroformed portion 104, and is formed so as to come into close contact with the outer surface of the electroformed portion 104. The resin portion 105 is provided on the surface coming into contact with the electroformed portion 104, and is constituted by high-adhesion-force portions 151 having a high adhesion force with respect to the electroformed portion 104, and a low-adhesion-force portion 152 having an adhesion force with respect to the metal lower than that of the high-adhesion-force portions 151. In this manner, by providing the high-adhesion-force portions 151 in the resin portion 105, the adhesiveness between the electroformed portion 104 and the resin portion 105 are increased, and it is possible to improve a detachment resistance therebetween. Further, the low-adhesion-force portion 152 is not required to have adhesiveness with the electroformed portion 104, and hence the range of selection of material is widened. As a result, it is possible to use a resin satisfying required bearing properties of the resin portion 105 such as moldability and a low-outgassing property.

The high-adhesion-force portions 151 are distributed randomly like independent islands on the outer surface of the electroformed portion 104, and a material of the low-adhesion-force portion 152 enters between the high-adhesion-force portions 151 (see portions A of the enlarged view of FIG. 8). As a result, the anchor effect is exerted between the electroformed portion 104 and the resin portion 105, to thereby further increase the detachment resistance therebetween.

The high-adhesion-force portions 151 and the low-adhesion-force portion 152 are made of the same kind of material. As the material for the resin, there may be used, for example, an amorphous resin such as polysulfone (PSF), polyethersulfone (PES), polyphenylsulfone (PPSU), or polyetherimide (PEI), or a crystalline resin such as a liquid crystal polymer (LCP), polyether ether ketone (PEEK), polybutylene terephthalate (PBT), or polyphenylene sulfide (PPS), as a base resin. Of course, those are merely examples and it is possible to select the arbitrary resin as long as the material fits the usage and the use environment of the bearing. If required, it is also possible to use a material obtained by mixing a plurality of the above-mentioned resins or resins other than the above. Further, by adding, in the resin, various fillers such as a reinforcement material (form thereof is not limited; any form such as fibrous form and powdery form may be employed), lubricant, and conducting agent, it is also possible to improve properties thereof. The material of the low-adhesion-force portion 152 contains, in consideration of a die-separation property from the die, a die-separation agent such as PTFE powder and polyethylene. On the other hand, as the material of the high-adhesion-force portions 151, a material in which the content rate of the die-separation agent is zero or the content rate of the die-separation agent is lower than that of the material of the low-adhesion-force portion 152.

The shaft member 102 has an outer peripheral surface 102a having a cylindrical surface shape, and a spherical protruding portion 102b is formed in the lower end thereof. When the shaft member 102 is rotated, a radial bearing clearance is formed between the outer peripheral surface 102a of the shaft member 102 and the inner peripheral surface 104a1 of the electroformed portion 104. When the dynamic pressure generating grooves 104a11 and 104a12 generate dynamic pressure actions in the lubricating fluid (for example, the lubricating fluid) in the radial bearing clearance, the radial bearing portions R1 and R2 for supporting the shaft member 102 in the radial direction are formed. Further, the tip end portion of the spherical protruding portion 102b at the lower end of the shaft member 102 comes into contact with the upper end surface 104b1 of the bottom portion 104b of the electroformed portion 104, to thereby constitute a pivot bearing. As a result, a thrust bearing portion T for supporting the shaft member 102 in the thrust direction is formed.

Hereinafter, an example of a method of forming the bearing device 101 is described with reference to the drawings while centering the description on the manufacturing process of the bearing member 103.

The shaft member 103 is manufactured through the following steps in the stated order: step of depositing and forming the electroformed portion 104 serving as an electroformed shell on an outer surface of a master shaft 120 (electroformed portion deposition step); step of forming the high-adhesion force portions 151 on the outer surface of the electroformed portion 104 (the high-adhesion-force portions forming step); step of injection-molding the low-adhesion-force portions 152 with the electroformed portion 104, the high-adhesion-force portion 151, and the master shaft 120 used as insertion components (insertion-molding step); and step of separating the electroformed portion 104 and the master shaft 120 (separation step).

In the electroformed portion deposition step, the master shaft (negative electrode) and a positive electrode is arranged in electrolyte solution, and a predetermined voltage is applied between the electrodes. As a result, an integrated product (hereinafter, referred to as electroformed shaft 115) in which the electroformed portion 104 is deposited on the outer surface of the master shaft 120 as illustrated in FIG. 9 is formed.

The master shaft 120 is formed of, for example, quenched stainless steel. In this embodiment, on the outer peripheral surface 120a of the master shaft 120, molding dies 120a1 and 120a2 for forming the dynamic pressure generating grooves 104a11 and 104a12 (see FIG. 8) on the inner peripheral surface 104a1 of the electroformed portion 104 are provided. The molding dies 120a1 and 120a2 are constituted by recessed portions having a shape corresponding to hill portions of the dynamic pressure generating grooves 104a11 and 104a12. The material of the master shaft 120 is not limited to the stainless steel, and it is possible to select any material regardless of metal and nonmetal as long as the material has a masking property, electrical conductivity, and chemical resistance like chromium-based alloy and nickel-based alloy. Note that accuracy of the outer peripheral surface of the master shaft 120 directly affects surface accuracy of the inner peripheral surface 104a1 of the electroformed portion 104 serving as a radial bearing surface for the shaft member 103, and hence it is desirable to finish the outer peripheral surface of the master shaft 120 to be accurate as much as possible.

In a part other than a region in which the electroformed portion 104 is to be formed of the outer peripheral surface 120a of the master shaft 120, a non-conductive masking portion 114 is formed in advance. As a material for forming the masking portion 114, a material having non-conductivity and corrosion resistance with respect to the electrolyte solution is selectively used.

The electrolyte solution contains metal (for example, nickel ion) becoming a material for depositing the electroformed portion 104. The kind of metal for deposition is appropriately selected depending on required properties such as hardness and oil resistance required for the inner peripheral surface 104a1 of the electroformed portion 104 serving as the radial bearing surface. Further, the electrolyte solution may contain a sliding material such as carbon or a stress-alleviating material such as saccharin as required.

The electroformed shaft 115 manufactured in the above-mentioned manner is transferred to a high-adhesion-force portion forming step. In this step, first, as illustrated in FIG. 10(a), the electroformed shaft 115 is immersed in process liquid 110. The process liquid 110 is slurry obtained by suspending a resin powder 111 in liquid such as alcohol. It is preferred that a particle of the resin powder 111 have a diameter in a range of from 1 μm or more to 200 μm or less, and an average mean diameter in a range of from 30 μm or more and 100 μm or less.

When the electroformed shaft 115 is pulled up from the process liquid 110, the resin powder 111 adheres to the outer peripheral surface 104a2 of the electroformed portion 104 of the resin powder 111 and the lower end surface 104b2 of the bottom portion 104b (see FIG. 10(b)). In this state, the electroformed shaft 115 is increased in temperature by hot air or the like so as to dry the electroformed shaft 115 simultaneously with melting the resin powder 111, to thereby form the high-adhesion-force portions 151 on the outer surface of the electroformed portion 104 (see FIG. 10(c)). In this case, when the density of the resin powder 111 adhered on the outer surface of the electroformed portion 104 is excessively high, the high-adhesion-force portions 151 uniformly cover the entire outer surface of the electroformed portion 104, and hence there is a risk that the anchor effect between the high-adhesion-force portions 151 and the low-adhesion-force portion 152 is not sufficiently exerted. Therefore, it is preferred that, by adjusting density of the resin powder 111 to be introduced in the process liquid 110, the high-adhesion-force portions 151 be randomly formed on the outer surface of the electroformed portion 104. Alternatively, by using the resin powder 111 having a wide variety of particle diameters, it is also possible to positively form concavities and convexities in the thickness direction in the outer peripheries of the high-adhesion-force portions 151 so as to obtain the anchor effect.

The electroformed shaft 115 in which the high-adhesion-force portions 151 are thus formed is provided and arranged as an insertion component in a die for induction molding the low-adhesion-force portion 152.

FIG. 11 conceptually illustrates an insertion-molding step of the low-adhesion-force portion 152. The die used for this molding step includes a movable die 116 and a stationary die 117. The stationary die 117 is provided with a sprue, a runner (both of which are not shown), and a gate 118. In the state in which the electroformed shaft 115 is fixed to the movable die 116, the movable die 116 is caused to approach the stationary die 117, and then both the dies 116 and 117 are clamped. As a result, a cavity 119 is formed in the inside of both the dies 116 and 117. Further, of both the dies 116 and 117, a die in which the insertion-molded product remains at the time of die opening (in this case, movable die 116) is provided with an ejection mechanism for extruding and discharging the molded product to the outside of the die. In this embodiment, as the ejection mechanism, a plurality of extrusion pins 121 constituted so as to be capable of making a relative movement with respect to the movable die 116 in the axial direction are provided. Note that the gate 118 is a dot-like gate in this embodiment. For example, of the stationary die 117, the gate 118 is formed at a position corresponding to the bottom center of the resin portion 105. The area of the gate 118 is set to a proper value according to viscosity of a molten resin filling the die and the shape of the molded product.

In the die having the above-mentioned structure, the movable die 116 is caused to approach the stationary die 117 while the electroformed shaft 115 is inserted into a predetermined position, to thereby perform clamping. In the clamped state, the molten resin is injected and filled in the cavity 119 through the sprue, the runner, and the gate 118, to thereby integrally mold the resin portion 105 together with the electroformed shaft 115. As a result, the resin portion 105 retaining the electroformed portion 104 is formed. In this time, between the high-adhesion-force portions 151 formed randomly on the outer surface of the electroformed portion 104, the injection material of the low-adhesion-force portion 152 enters to exert the anchor effect, and hence the detachment resistance between the electroformed portion 104 and the resin portion 105 is increased.

In this embodiment, the high-adhesion-force portions 151 and the low-adhesion-force portion 152 are formed of the same kind of resin. Therefore, when the injection material of the low-adhesion-force portion 152 comes into contact with the high-adhesion-force portions 151, the high-adhesion-force portions 151 are partially molten, and after the subsequent solidification, the resin portion 105 constituted by the high-adhesion-force portions 151 and the low-adhesion-force portion 152 can be integrally molded. Note that, in this case, when the high-adhesion-force portions 151 come into contact with the injection material to be completely mixed with the injection material, there is a risk that the high-adhesion-force portions 151 do not remain in the resin portion 105 after molding. Therefore, it is necessary to avoid complete melting of the high-adhesion-force portions 151 by adjusting the temperature of the injection material and a filler and the like to be contained in the resin of the high-adhesion-force portions 151.

After molding, die opening is performed, and the molded product in which the master shaft 120, the electroformed portion 104, and the resin portion 105 are integrated is released from the movable die 116. Specifically, after the die opening, the extrusion pins 121 of the ejection mechanism provided in one (movable die 116 in this case) of the dies are extruded toward the cavity 119, to thereby discharge the molded product from the movable die 116. In this time, by mixing in advance the die-separation agent in the injection material of the low-adhesion-force portion 152 of the resin portion 105 coming into contact with the die, the die-separation property between the die and the resin portion 105 can be improved, to thereby facilitate the die-separation. Note that, other than that, by injection-molding the low-adhesion-force portion 152 in a state in which spray-type PTEE and silicon fine powder is sprayed in advance on the die, it is also possible to improve the die-separation property between the die and the resin portion 105.

The thus released molded product is, in the subsequent separation step, separated into the master shaft 120 and the bearing member 103 (see FIG. 8) including the electroformed portion 104 and the resin portion 105. In this separation step, by applying impact, for example, to the master shaft 120, the electroformed portion 104, or the resin portion 105, the inner peripheral surface 104a1 of the electroformed portion 104 is separated from the outer peripheral surface 120a of the master shaft 120. As a result, the master shaft 120 is pulled out from the electroformed portion 104 and the resin portion 105, to thereby provide the bearing member 103 as a final product.

In the present invention, as described above, the detachment resistance between the resin portion 105 and the electroformed portion 104 is improved by providing the high-adhesion-force portions 151 in the resin portion 105, and hence it is possible to avoid a risk that the electroformed portion 104 and the resin portion 105 are separated from each other when the master shaft 120 is separated from the bearing member 103. Further, the material of the low-adhesion-force portion 152 enters between the high-adhesion-force portions 151 provided randomly on the outer surface of the electroformed portion 104 so as to exert the anchor effect, and hence the high-adhesion-force portions 151 and the low-adhesion-force portion 152 are fixed to each other more firmly. In particular, in this embodiment, there is a risk that the recessed portions 120a1 and 120a2 formed in the outer peripheral surface 120a of the master shaft 120 and the dynamic pressure generating grooves 104a11 and 104a12 formed in the inner peripheral surface 104a1 of the electroformed portion 104 engage with each other in the axial direction to apply large load for separating the fixation surfaces between the electroformed portion 104 and the resin portion 105. Therefore, it is effective to increase the fixation force between the electroformed portion 104 and the resin portion 105 according to the present invention.

The separation means for the electroformed portion 104 is not limited to the above-mentioned means. For example, it is also possible to use a method by heating or cooling the electroformed portion 104 and the master shaft 120 so as to generate a difference in thermal expansion amount therebetween, or a combined means of those means. Further, the separation step may be performed simultaneously with die separation of the molded product by the ejection mechanism.

The shaft member 102 provided with, for example, the rotor 131 is inserted along the inner periphery of the bearing member 103 formed as in the above-mentioned manner, and the lubricating oil is poured in the interior space of the bearing including the radial clearance between the outer peripheral surface 102a of the shaft member 102 and the inner peripheral surface 104a1 of the electroformed portion 104 from the side opened to the atmosphere (one-end-opening side). With this, the electroformed device (fluid dynamic bearing device) 101 whose interior space is filled with the lubricating oil is completed.

The present invention is not limited to the above-mentioned embodiment. Hereinafter, another embodiment of the present invention is described. Note that, in the following description, portions having the same structure and function as those in the above-mentioned embodiment are denoted by the same reference symbols and descriptions thereof are omitted.

In the above-mentioned embodiment, as the resin of the high-adhesion-force portions 151, that is, the resin of the resin powder 111, the same kind of resin as the low-adhesionforce portion 152 is used. However, the resin is not limited thereto. For example, if the high-adhesion-force portions 151 are formed of the resin having a melting point higher than that of the low-adhesion-force portion 152, it is possible to avoid, when the molten resin injected into the cavity comes into contact with the high-adhesion-force portions 151 at the time of injection molding of the low-adhesion-force portion 152, the situation in which the high-adhesion-force portions 151 are completely molten. Further, at the time of injection molding, the molten resin is injected into the cavity while being heated to the temperature higher than the melting point. However, when the high-adhesion-force portions 151 are formed of the resin having a melting point higher than this injection temperature, it is possible to more reliably avoid the above-mentioned trouble.

Further, in the above-mentioned embodiment, the high-adhesion-force portions 151 are formed randomly on the outer surface of the electroformed portion 104. However, when the anchor effect is not particularly necessary, the high-adhesion-force portions 151 may be formed in the cylindrical pattern, for example. In this case, for example, by performing insertion molding of the low-adhesion-force portion 152 in a state in which the inner peripheral surface of the cylindrical high-adhesion-force portions formed separately are fixed by bonding or the like to the outer peripheral surface 104a2 of the electroformed portion 104, the bearing member 103 is formed.

Further, in the above-mentioned embodiment, as the method of forming the electroformed portion 104, the so-called electrolytic plating of energizing the electrolyte solution is exemplified. However, the formation method is not limited thereto. For example, it is also possible to use the so-called nonelectrolytic plating in which the master shaft is immersed in a solution containing object metal and the electroformed portion 104 is deposited by chemical reaction of the substance in the solution. Other than that, the electroformed portion 104 may be formed by machine working or plastic working.

Hereinafter, a third embodiment of the present invention is described with reference to the drawings.

FIG. 12 is a sectional view conceptually illustrating an example of a motor incorporating a bearing device (electroformed bearing) 201 according to one embodiment of the present invention. The motor illustrated in FIG. 12 is used as a spindle motor for a disk drive such as an HDD, and includes a bearing device 201 for rotatably supporting the shaft member 202, a disk hub 203 provided to the shaft member 202, a stator coil 204 and a rotor magnet 205 opposed to each other through, for example, a radial gap, and a bracket 206 having an inner periphery to which a bearing member 207 of the bearing device 201 is fixed. The stator coil 204 is attached to the outer periphery of the cylindrical portion of the bracket 206, and the rotor magnet 205 is attached to the inner periphery of the disk hub 203. The disk hub 203 holds one or a plurality of disks D (two in the illustrated example) such as magnetic disks. In the above-mentioned structure, when the stator coil 204 is energized, the rotor magnet 204 is rotated by the electromagnetic force between the stator coil 204 and the rotor magnet 205. As a result, the disk hub 203 and the disk D held by the disk hub 203 rotate together with the shaft member 202.

The bearing device 201 illustrated in FIG. 13 includes, as main components, the shaft member 202 and the bearing member 207 having an inner periphery along which the shaft member 202 is inserted. The bearing member 207 includes an electroformed portion 208 and a die-molded portion 209 into which the electroformed portion 208 is inserted to be integrally die-molded with the electroformed portion 208. In this embodiment, the electroformed portion 208 is formed into the bottomed cylindrical shape having an opened upper end, and the die-molded portion 209 is also formed into the bottomed cylindrical shape so as to cover the outer surface of the electroformed portion 208. Note that, though the actual thickness of the electroformed portion 208 is sufficiently smaller compared with the thickness of the die-molded portion 209, the thickness of the electroformed portion 208 is illustrated exaggeratedly for facilitating understanding in the drawing.

The shaft member 202 is formed as a solid shaft by a metal such as stainless steel. An outer peripheral surface 202a of the shaft member 202 is formed into a cylindrical surface which is straight over the entire length in the axial direction, and a lower end surface 202b of the shaft member 202 is formed into a protruding curved surface protruding in an arc-like shape toward the lower side.

In the inner peripheral surface of the electroformed portion 208, there are formed a cylindrical surface 208a having a constant diameter, which serves as a separation surface with a master 212 used in a manufacturing process of the bearing member 207 (electroformed portion 208) described below, and an increased-diameter surface 208, which is positioned on the opening side compared with the cylindrical surface 208a, and is gradually increased in radial dimension in a tapered manner toward the upper side. The cylindrical surface 208a of the electroformed portion 208 functions as a bearing surface which forms a bearing clearance 210 in the radial direction between itself and the outer peripheral surface 202a of the shaft member 202, and the increased-diameter surface 208c of the electroformed portion 208 functions as a seal surface forming, between itself and the outer peripheral surface 202a of the shaft member 202, a tapered seal space 211, which is gradually decreased in radial dimension toward the lower side.

In the upper end outer periphery of the electroformed portion 208, there is formed a decreased-diameter surface 208d having a protruding curved surface in which a radial dimension is gradually decreased toward the upper side (direction of pulling out the master 212), and the die-molded portion 209 is integrally die-molded with the electroformed portion 208 so as to cover the decreased-diameter surface 208d. An inner bottom surface 208b of the electroformed portion 208 is formed into a smooth and flat surface.

The interior space of the bearing including the bearing clearance 210 is filled with the lubricating oil as the lubricating fluid, and the oil surface of the lubricating oil is constantly maintained in the seal space 211. Note that, though the radial dimensions of the bearing clearance 210 and the seal space 211 are both actually micro compared with the radial dimensions of the shaft member 202 and the bearing member 207, the radial dimensions of the bearing clearance 210 and the seal space 211 are illustrated exaggeratedly for facilitating understanding in the illustrated example.

In the bearing device 201 having the above-mentioned structure, when the shaft member 202 and the bearing member 207 make a relative rotation (in this embodiment, when the shaft member 202 rotates), an oil film of the lubricating oil is formed in the bearing clearance 210. Through the oil film, the shaft member 202 is supported so as to be rotatable with respect to the bearing member 207 in the radial direction. Simultaneously, the lower end surface 202b of the shaft member 202 is supported through the lubricating oil by the inner bottom surface (inner bottom surface 208b of the electroformed portion 208) of the bearing member 207 while being in contact thereto. With this, the shaft member 202 is supported so as to be rotatable with respect to the bearing member 207 in the thrust direction.

Further, the seal space 211 has a tapered shape gradually decreased in diameter toward the inside of the bearing. Therefore, at the time of rotation of the shaft member 202, the lubricating oil in the seal space 211 is drawn, due to the drawing effect by a capillary force, in the direction of narrowing the seal space 211, that is, toward the inside of the bearing member 207. As a result, it is possible to effectively prevent leakage of the lubricating oil from the inside of the bearing member 207.

Further, the seal space 211 is provided in the upper portion of the bearing clearance 210 so as to adjacent thereto, the seal space 211 functioning not only as a seal portion (tapered seal portion) for preventing leakage of the lubricating oil as described above but also as an oil pool. Therefore, at the time of bearing operation, it is possible to stably supply the lubricating oil into the bearing clearance 210. With this, it is possible to prevent disruption of the oil film, which is caused by lack of the lubricating oil in the bearing clearance 210, to thereby maintain the high rotation performance.

Next, the manufacturing step of the bearing member 201 having the above-mentioned structure is described with respect to the drawings while centering the description on the manufacturing step of the bearing member 207.

The bearing member 207 is manufactured through the following steps in the stated order: (A) step of manufacturing a master serving as a molding base material for the electroformed portion 208; (B) step of forming a masking portion on the surface of the master; (C) step of depositing and forming the electroformed portion 208 by electroforming on the master on which the masking portion is formed; (D) step of injection-molding the die-molded portion 209 integrally with the master provided with the electroformed portion 208 while the master is inserted thereinto; and (E) step of separating the bearing member 207 including the electroformed portion 208 from the master.

(A) Master Manufacturing Step

In the manufacturing step, a solid shaft shaped master 212 is manufactured of conductive material such as quenched stainless steel. As a material for forming the master 212, as long as it satisfies the required electrical conductivity, chemical resistance, and the like, it is possible to use, other than the stainless steel, another metal such as nickel-based alloy or chromium-based alloy, or a nonmetal such as ceramic which is subjected to conductive treatment (for example, a conductive film is formed on its surface). Of the surface of the master 212, the surface accuracy of a region in which the electroformed portion 208 is deposited and formed (hereinafter, referred to as deposition and formation portion M) directly affects the accuracy of the cylindrical surface 208a and the inner bottom surface 208b serving as bearing surfaces of the electroformed portion 208. Therefore, the surface accuracy of the deposition and formation portion M is finished so as to be highly accurate according to the accuracy required for the bearing surface. Note that the region excluding the deposition and formation portion M may be subjected to surface treatment for enhancing adhesiveness of the masking material.

(B) Masking Step

In the masking step, of the outer surface of the master 212, a masking portion 215 is formed in the region excluding the deposition and formation portion M. As a masking material 213 for forming the masking portion 215, in consideration of the electroforming described later, a resin having insulating properties and corrosion resistance with respect to the electrolyte solution is used. Further, in this embodiment, when forming the masking portion 215 by the following procedure, a photo-curing resin is used. Specifically, of the photo-curing resins, there is used an ultraviolet-curing resin which has particularly excellent curing speed and has viscosity of 5 Pa·s or more and 12 Pa·s or less (viscosity is limited thus by the reason described below). Specifically, for example, it is possible to use SUV-103 (viscosity: 10 Pa·s) and SUV-381 (viscosity: 8 Pa·s) manufactured by SANYU REC CO. LTD., and SUV-103 is used in this embodiment. Note that various additives such as a photopolymerization initiators may be added appropriately as required into the above-mentioned resin.

Hereinafter, formation procedure of the masking portion 215 is described in detail with reference to FIG. 14.

First, as illustrated in FIG. 14(a), the above-mentioned masking material 213 is filled in a container or the like, then the region excluding the deposition and formation portion M of the master 212 is immersed in the thus filled masking material 213, and after that the master 212 is pulled up (dipping). After the master 212 is pulled up, as illustrated in FIG. 14(b), a masking layer 213' in which the masking material 213 is adhered to the surface of the master 212 by a predetermined thickness is formed thereon. The masking layer 213' has a thickness which is gradually increased by its own weight toward a side opposite to the deposition and formation portion M in the axial direction.

Next, as illustrated in FIG. 14(c), the master 212 is turned upside down, and the master 212 is placed upside down. When the master 212 is placed upside down, the masking material 213 on the opposite side of the deposition and formation portion M of the masking layer 213' gradually flows toward the deposition and formation portion M by its own weight. Then, as illustrated in FIG. 14(c), a tapered surface 214 is formed on one end portion of the masking layer 213' (end portion on the deposition and formation portion M side). At the point in time when an inclined angle α of the tapered surface 214 with respect to the outer peripheral surface (axis) of the master 212 becomes a predetermined value, a light (ultraviolet light) 216 is radiated, as illustrated in FIG. 14(d), from a curing device such as an ultraviolet lump (not shown), to thereby cure the masking layer 213'. The curing of the masking layer 213' is performed so as to gradually progress from its surface layer portion to inside portion. When the masking layer 213' is completely cured, the masking portion 215 is formed in a region excluding the deposition and formation portion M of the master 212. By using the ultraviolet-curing resin as the masking material 213 in this manner, of the masking layer 213' adhered to the master 212, the surface layer portion is first cured. Therefore, it is possible to prevent deformation of the masking layer 213' as much as possible to obtain the masking portion 215 of a predetermined shape.

In this case, when the inclined angle α of the tapered surface 214 provided at the one end of the masking portion 215 is smaller than 15°, strength of the masking portion 215 becomes remarkably insufficient, which increases a risk that the tip end of the masking portion 215 remains in the inner periphery of the increased-diameter surface 208c of the electroformed portion 208 when the masking portion 215 is eliminated after the electroforming described later. On the other hand, when the inclined angle α is larger than 60°, it becomes difficult to form the decreased-diameter surface 208d along the outer periphery at the one end of the electroformed portion 208 at the time of the electroforming described later. In view of such circumstances, the inclined angle α is desirably set 15° or more and 60° or less ($15° \leq α \leq 60°$, and more desirably 15° or more and 45° or less.

Such shape at the one end of the masking portion 215 can be formed accurately by managing, according to, for example, viscosity of the masking material 213 to be used, a period of time after the reversal of the master 212 until start of radiation of the light 216. Note that the inclined angle of the increased-diameter surface 208c formed along the inner periphery at the one end of the electroformed portion 208 corresponds to the inclined angle α of the tapered surface 214 of the masking portion 215, and directly affects volume of the seal space 211. Therefore, the inclined angle α of the tapered surface 214 may be set to an arbitrary value within the above-mentioned range according to the required volume of the seal space 211.

Further, because the masking portion 215 is formed through the above-mentioned procedure, it becomes meaningful to set the viscosity of the masking material 213, which is to be used, to within the range of 5 Pa·s or more and 12 Pa·s or less. That is, it becomes difficult to form the masking portion 215 of the predetermined shape in both the cases where the viscosity of the masking material 213 is lower than 5 Pa·s and where it is higher than 12 Pa·s. Specifically, in the former case, flowability of the masking material 213 is relatively good, and hence it is difficult to completely cure the masking layer 213' while maintaining a predetermined shape of the making layer 213'. In addition, the layer thickness of the masking layer 213' becomes small, which leads to a risk that the inclined angle α of the tapered surface 214 to be provided in the masking portion 215 becomes less than 15°. On the other hand, in the latter case, the flow ability of the masking material 213 is low, which leads to a risk that the masking layer 213' does not smoothly flow at the stage illustrated in FIG. 14(c), and hence the tapered surface 214 to be provided at the one end of the masking portion 215 cannot be formed. In addition, even when the tapered surface 214 can be formed, the inclined angle α thereof becomes excessively large.

When the masking portion 215 is formed in the above-mentioned manner, a clearance is not formed between the masking portion 215 and the master 212. Therefore, at the time of electroforming described below, burr is prevented from being generated at the one end of the electroformed portion 208, to thereby form the electroformed portion 208 with high accuracy at low cost.

(C) Electroforming Step

The master 212 on which the masking portion 215 is formed is transferred to the electroforming step. In this step, the master 212 is immersed in the electrolyte solution containing metal ion such as Ni and Cu, and then the master 212 is energized so that the object metal is deposited (electrolytically deposited) on the deposition and formation portion M of the master 212, to thereby form the electroformed portion 208. The electrolyte solution may contain a sliding material such as carbon and fluorine-based particles, or a stress-alleviating material such as saccharin as required. The kind of electro-deposited metal is appropriately selected depending on physical properties such as hardness and fatigue strength required for the cylindrical surface 208a serving as the bearing surface, and chemical properties.

The electroformed portion 208 is deposited and formed in the manner of gradually being accumulated on the deposition and formation portion M of the master 212. At the initial stage of the electroforming, as illustrated in FIG. 15, an electroformed layer (first electroformed layer 281) is deposited and formed up to the boundary with the one end of the masking portion 215. As the electroforming progresses, a second electroformed layer 282 is formed so as to cover one end of the first electroformed layer 281 and so that the inner periphery at one end of second electroformed layer 282 follows the tapered surface 214 of the masking portion 215.

When the electroforming further progresses, in the same manner as described above, another electroformed layer is accumulated so as to cover the second electroformed layer 282. When the electroformed layer of the predetermined thickness is deposited and formed in this manner, the bottomed cylindrical electroformed portion 208 is formed on the deposition and formation portion M of the master 212. Formation and deposition of the electroformed portion 208 in the above-mentioned mode results in that the increased-diameter surface 208c whose radial dimension is gradually increased so as to be tapered in the direction of pulling out the master 212 is formed along the inner periphery at the one end of the completed electroformed portion 208, and the decreased-diameter surface 208d whose radial dimension is gradually decreased so as to form a protruding curved surface in the direction of pulling out the master 212 is formed along the outer periphery at the one end of the completed electroformed portion 208. Note that, when the thickness of the electroformed portion 208 is excessively large, a separation property from the master 212 is decreased, and when the thickness thereof is excessively small, durability of the electroformed portion 208 is decreased. Therefore, the thickness of the electroformed portion 208 is set to an optimum thickness of, for example, approximately 10 µm to 200 µm, according to the required bearing performance and bearing size, and usage.

Note that the electroformed portion 208 may be formed by a method conforming to the nonelectrolytic plating (chemical plating) other than the above-mentioned method conforming to the electrolytic plating (electro-plating).

After the electroformed portion 208 is deposited and formed on the deposition and formation portion M of the master 212, the masking portion 215 provided on the master 212 is eliminated. Elimination of the masking portion 215 is performed, for example, by immersing the master 212 for a predetermined period of time in organic solvent such as aceton or toluene so as to swell the masking portion 215 and then taking out the master 212 from the organic solvent to pull out the masking portion 215. When the masking portion 215 is eliminated in this manner, as illustrated in FIG. 16(b), an electroformed member 217 constituted by an integrated product of the master 212 and the electroformed portion 208 is formed. When the masking portion 215 is eliminated in such mode, it is possible to effectively prevent the situation that the electroformed portion 208 is damaged when the masking portion 215 is eliminated.

When the masking portion 215 is eliminated in this manner, the increased-diameter surface 208c of the electroformed portion 208 becomes a separation surface from (the tapered surface 214 of) the masking portion 215 provided on the master 212, and hence the increased-diameter surface 208c of the electroformed portion 208 is formed into an a highly accurate surface following the tapered surface 214 of the masking portion 215. Therefore, in this embodiment in which the tapered surface 208c of the electroformed portion 208 is used as one of the surfaces forming the seal space 211, it is possible to high-accurately perform oil amount management and the like, and hence the bearing performance can be stabilized. Note that, by forming the increased-diameter, surface 208c in this manner, surface texture of the increased-diameter surface 208c becomes different from surface texture of the cylindrical surface 208a becoming the separation surface from the master 212.

(D) Insertion-Molding Step

The electroformed member 217 formed in the above-mentioned manner is transferred to the insertion-molding step, and is supplied and arranged as an insertion component in a molding die for insertion-molding the die-molded portion 209.

FIG. 17 conceptually illustrates the insertion-molding step of the die-molded portion 209. The molding die illustrated in the figure includes, as main components, an upper die 218 and a lower die 219 which are capable of making a relative movement in the axial direction. In the state in which both the dies 218 and 219 are clamped, a cavity 221 corresponding to the shape of the die-molded portion 209 is formed between both the dies 218 and 219. In this embodiment, the lower die 219 serves as a fixed side. In the axis of the lower die 219, there is provided a gate 220 for injecting a molten material, which is a molten resin in this case, into the cavity 221. On the other hand, in the upper die 218 serving as a movable side, a retaining hole 218a for retaining the master 212 (electroformed member 217) is provided, and a plurality of ejection pins 222 serving as discharging mechanism for discharging the molded product to the outside of the die are provided in the circumferential direction. The ejection pins 222 are movable up and down relatively to the upper die 218 by a driving mechanism (not shown). Note that, though the gate 220 is a dot-like gate in this embodiment, a gate having another shape may be adopted, such as an annular gate (film gate). Further, the area of the gate 220 is set to an appropriate value according to viscosity of the molten resin to be injected and the like.

In the molding die having the above-mentioned configuration, after the electroformed shaft 217 is positioned and arranged in the retaining hole 218a of the upper die 218, the lower die 219 is brought closer to the upper die 218, to thereby perform clamping. After the clamping, through a sprue, a runner (both of which are not shown), and the gate 220, the molten resin is injected into the cavity 221 so as to be filled therein, and the die-molded portion 209 is die-molded together with the electroformed shaft 217. As a result, the die-molded portion 209 of the bottomed cylindrical shape covering the outer surface of the electroformed portion 208 is formed.

The resin used for forming the mold-forming unit 209 is a material in which, for example, a crystalline resin such as a liquid crystal polymer (LCP), polyphenylene sulfide (PPS), polyether ether ketone (PEEK), polyacetal (POM), and polyamide (PA), and, for example, an amorphous resin such as polyphenylsulfone (PPSU), polyethersulfone (PES), polyetherimide (PEI), and polyamideimide (PAI) is used as a base resin. One kind or two or more kinds of the base resins exemplified above may be used as a mixture. In addition, when needed, one kind or two or more kinds of various fillers such as a reinforcing material (which may be in any form such as fiber or powder), a lubricant, and a conductive material may be added to the above-mentioned base resin.

After molding of the die-molded portion 209, die opening is performed, thereby die-separating from the upper die 218 the molded product in which the master 212, the electroformed portion 208, and the die-molded portion 209 are integrated. Specifically, after the die-opening, the ejection pins 222 provided in the upper die 218 are moved relatively to the upper die 218 toward the lower die 219 so that the molded product remaining in the upper die 218 is extruded toward the lower die 219 so as to be discharged to the outside of the die.

(E) Separation Step

The molded product molded and released from the mold die as described above is transferred to the separation step, and is separated into the bearing member 207 in which the electroformed portion 208 and the die-molded portion 209 are integrated, and the master 212. In the separation step, the inner peripheral surface (cylindrical surface 208a) of the electroformed portion 208 is slightly increased in diameter by applying impact to the master 212 or the bearing member 207 (any one or both of the electroformed portion 208 and the die-molded portion 209), for example, and hence the electroformed portion 208 can be stripped from the surface of the master 212. The master 212 then can be separated from the bearing member 207, and the bearing member 207 as a final product is obtained by pulling out the master 212 from the bearing member 207.

Note that the separation means for the electroformed portion 208 is not limited to the above-mentioned means. For example, it is possible to use a method by heating (or cooling) the electroformed portion 208 and the master 212 so as to generate a difference in thermal expansion amount therebetween, or a combined means of both means (applying impact and heating).

The shaft member 202 prepared separately from the master 212 is inserted along the inner periphery of the bearing member 207 formed as in the above-mentioned manner, and the lubricating oil as lubricating fluid is filled in the interior space of the bearing member 207. With this, the bearing device 201 illustrated in FIG. 13 is completed. Meanwhile, the separated master 212 can be repeatedly used for electroforming.

In the above-mentioned manner, the die-molded portion 209 is integrally molded so as to face the decreased-diameter surface 208d provided along the outer periphery at the one end of the electroformed portion 208 to be inserted. Therefore, as apparent also from FIG. 17, at the time of die separation of the molded product from the molding die, the die-molded portion 209 engages with the electroformed portion 208 in the direction of receiving an extrusion force (pushing force) by the ejection pins 222, and the relative movement in the axial direction of the electroformed portion 208 and the die-molded portion 209 is restricted. As a result, an engaging force between the electroformed portion 208 and the die-molded portion 209 is increased, and it is possible to effectively prevent separation between the electroformed portion 208 and the die-molded portion 209 at the time of die-separation. Further, from the same point of view, it is possible to effectively prevent separation between the electroformed portion 208 and the die-molded portion 209 also by a pulling force (for example, binding force by a jig) for the master 212 acting on the die-molded portion 209 when the master 212 is pulled out.

Further, in terms of the characteristics of the electroforming, the surface (separation surface from the master 212) in which deposition on the master 212 is started, which becomes the cylindrical surface 208a of the electroformed portion 208, is formed to a tight surface transferred with the surface accuracy of the master 212 (deposition and formation portion M) with high accuracy. Meanwhile, the surface on the side in which deposition is finished, that is, the outer surface of the electroformed portion 208 is formed into a rough surface. Therefore, when the die-molded portion 209 is formed, the molten resin enters into fine concavities and convexities on the surface of the electroformed portion 208, and hence the engaging force between the electroformed portion 208 and the die-molded portion 209 is further increased due to the so-called anchor effect.

Further, the decreased-diameter surface 208d of the electroformed portion 208 is formed at the time of electroforming, and hence a particular increase in cost due to provision of the decreased-diameter surface 208d does not occur. Therefore, the bearing member 207 in which the electroformed portion 208 and the die-molded portion 209 are engaged strongly can be manufactured at low cost.

Hereinabove, description is made of the case of injection-molding the die-molded portion 209 with the resin. However, the die-molded portion 209 may be injection-molded with the molten material other than the resin, for example, a metal such as magnesium and aluminum. However, in such case, the metal used for molding of the die-molded portion 209 indispensably has a melting point lower than that of the electroformed portion 208 (electroformed metal) in view of preventing deterioration of shape accuracy of the electroformed portion 208 serving as the insertion component. Note that, when nickel (Ni) or copper (Cu) is used as the electroformed metal, because magnesium and aluminum have a melting point lower than that of the electroformed metal, they can be used without any problem. In addition, the die-molded portion 209 can be formed by a so-called MIM in which injection molding is performed using mixture of metal powder and a binder before degreasing and sintering. Of course, also in this case, it is necessary to select, as the metal powder to be used, metal powder having a melting point lower than that of the electroformed metal.

Further, though description is made hereinbove of the bearing device 201 using the shaft member 202 prepared separately from the master 212 used for electroforming, it is also possible to use the master 212 as the shaft member 202 as it is. In this case, as the master 212 illustrated in FIG. 14 and the like, by manufacturing not a master having flat end surfaces but a master in which one end is formed into a protruding curved surface, and by forming a masking portion on this protruding curved surface side, it is possible to constitute the bearing device 201 illustrated in FIG. 13 by this master.

Further, hereinabove, description is made of the bearing device 201 in which a support in the radial direction of the shaft member 202 with respect to the bearing member 207 is constituted by the so-called cylindrical bearing. However, it is also possible to adopt the bearing other than the cylindrical bearing. For example, though not shown, by providing, to any one of the outer peripheral surface 202a of the shaft member 202 and the inner peripheral surface (cylindrical surface 208a of the electroformed portion 208) of the shaft member 207, a radial dynamic pressure generating portion for generating a dynamic pressure action of the lubricating oil, it is possible to constitute the support in the radial direction of the shaft member 202 by the so-called dynamic pressure bearing. Note that, as the radial dynamic pressure generating portion, it is possible to adopt, other than the dynamic pressure generating groove of the herringbone pattern or the spiral pattern, the plurality of arc surfaces or the axial grooves provided in the circumferential direction.

Further, hereinabove, description is made of the bearing device 201 in which the support in the thrust direction of the shaft member 202 with respect to the bearing member 207 is constituted by the so-called pivot bearing. However, by forming the lower end surface 202b of the shaft member 202 into the flat surface and by providing the thrust dynamic pressure generating portions to the flat surface or the inner bottom surface (inner bottom surface 208b of the electroformed portion 208) of the bearing member 207 opposed thereto, it is possible to constitute the support in the thrust direction of the shaft member 202 by the so-called dynamic pressure bearing. As the thrust dynamic pressure generating portion, it is possible to adopt a dynamic pressure groove of the spiral pattern or the herringbone pattern, a plurality of radial grooves or the like (they are not illustrated).

Further, hereinabove, the lubricating oil is used as the lubricating fluid to be filled in the inner space of the bearing device 201. However, other fluids capable of forming a lubricating fluid film, such as lubricating grease and magnetic fluid, and further, gas etc. including the air may be used.

Further, the bearing device 201 described above is incorporated not only into the spindle motor for a disk drive illustrated in FIG. 12 but also into another motor, for example, a fan motor for a personal computer (PC), to be suitably used.

BRIEF DESCRIPTION OF THE DRAWINGS

FIG. 14a A view illustrating a state in which a master is immersed in a masking material.
FIG. 14b A view illustrating a state in which the master is pulled out from the masking material.
FIG. 14c A view illustrating a state in which the master is reversed from the state of FIG. 14b.
FIG. 14d A view illustrating a state of curing a masking layer.

Figure 1:
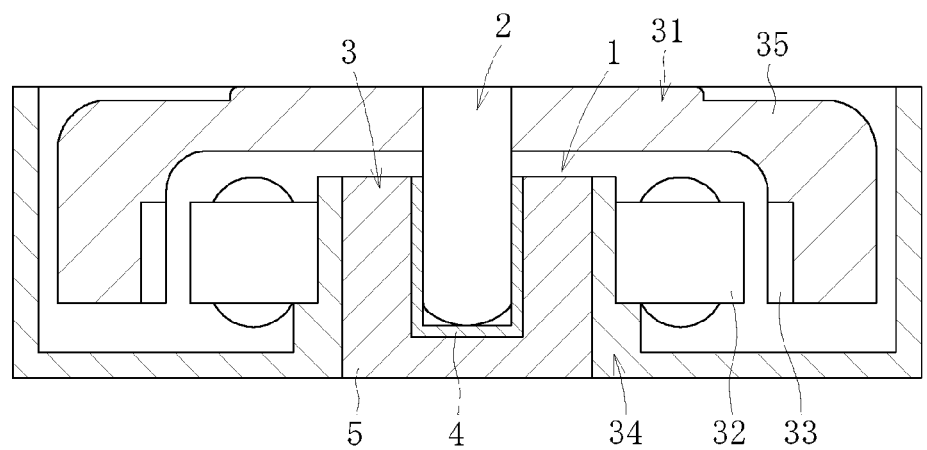
FIG. 1 A sectional view of a fan motor into which a bearing of the present invention is incorporated.
Figure 2:
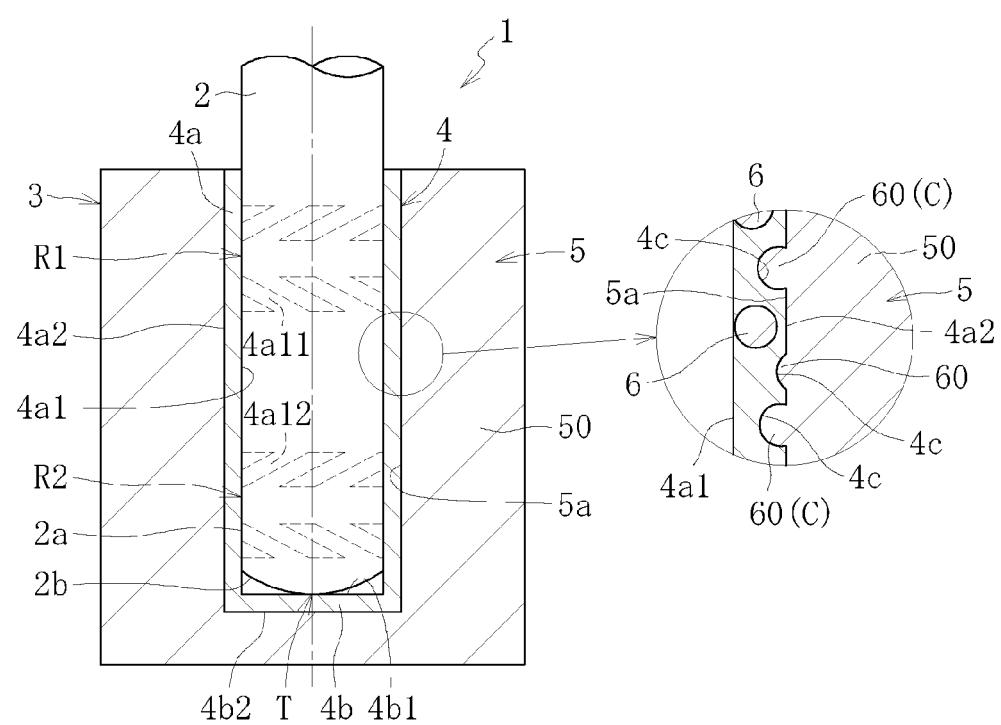
FIG. 2 A sectional view of a bearing device.
Figure 3:
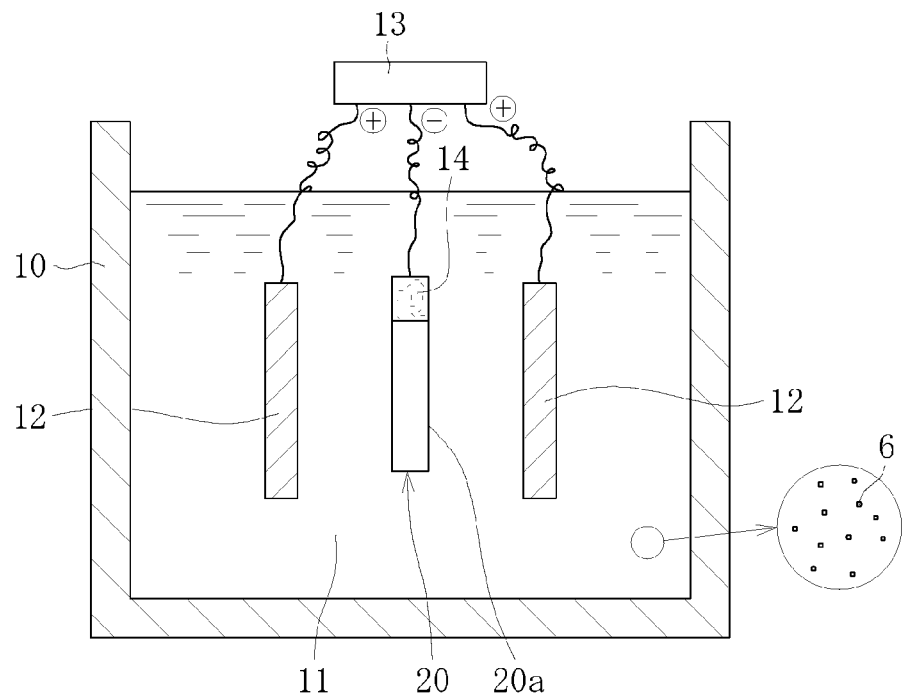
FIG. 3 A sectional view illustrating an electroforming step.
Figure 4:
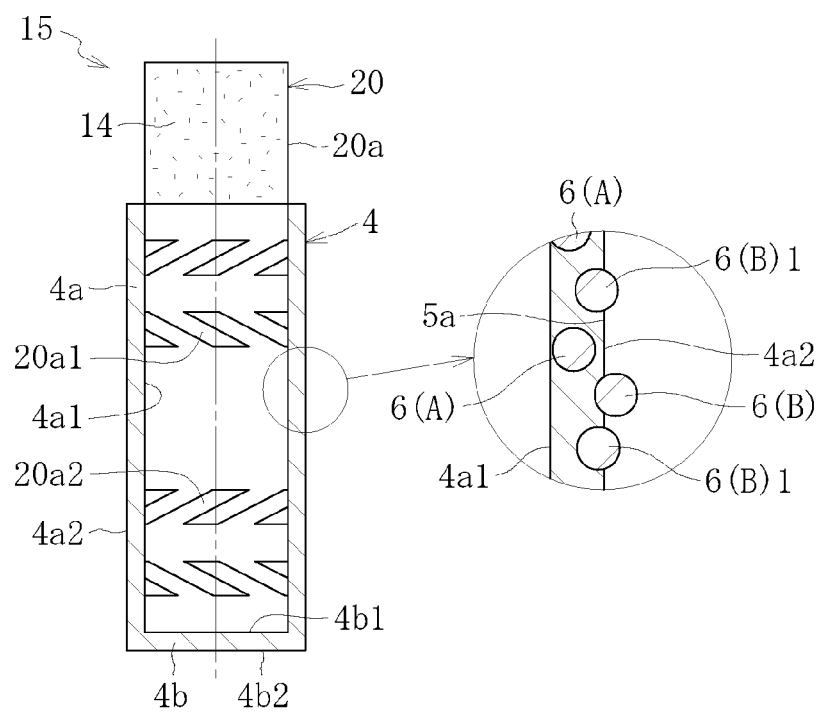
FIG. 4 A sectional view of an electroformed shaft.
Figure 5:
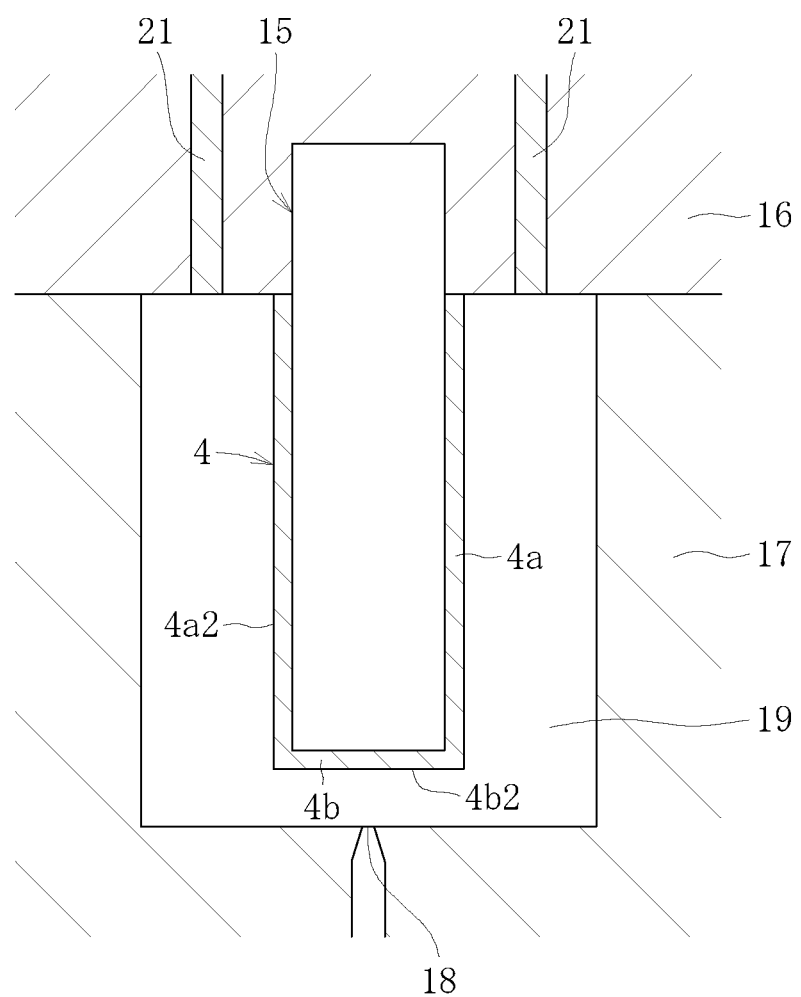
FIG. 5 A sectional view illustrating an injection-molding step.
Figure 6:
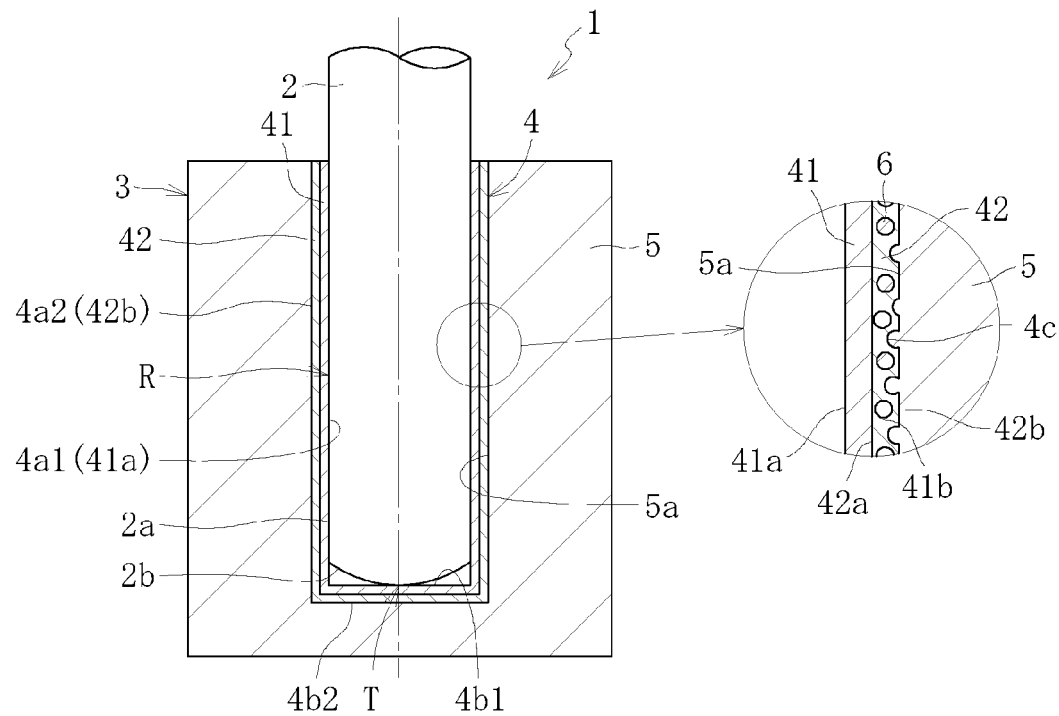
FIG. 6 A sectional view illustrating a bearing device according to another embodiment.
Figure 7:
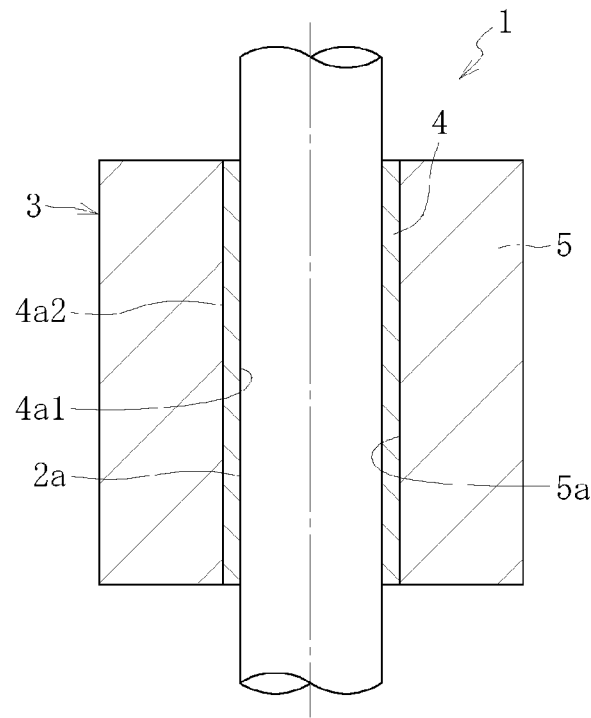
FIG. 7 A sectional view of a bearing device according to still another embodiment.
Figure 8:
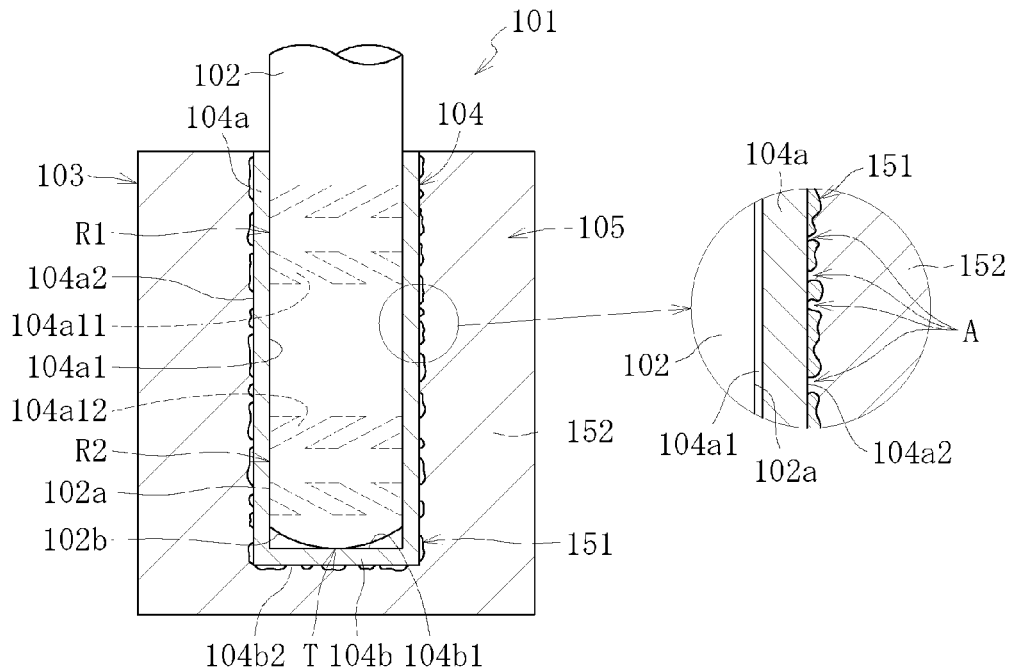
FIG. 8 A sectional view of an electroformed bearing according to the present invention.
Figure 9:
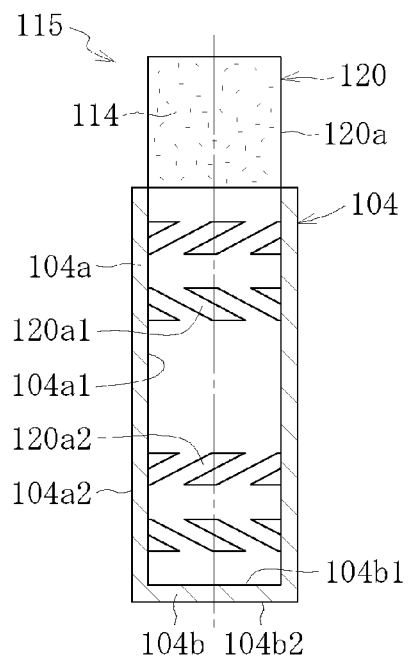
FIG. 9 A sectional view illustrating the electroformed shaft.
Figure 10A:
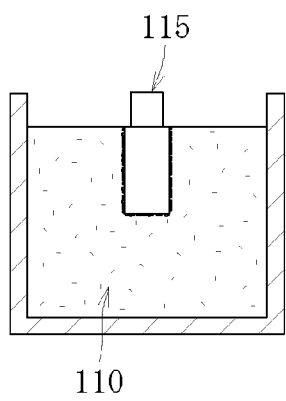
FIG. 10a A sectional view illustrating an electroformed-portion-forming step.
Figure 10B:
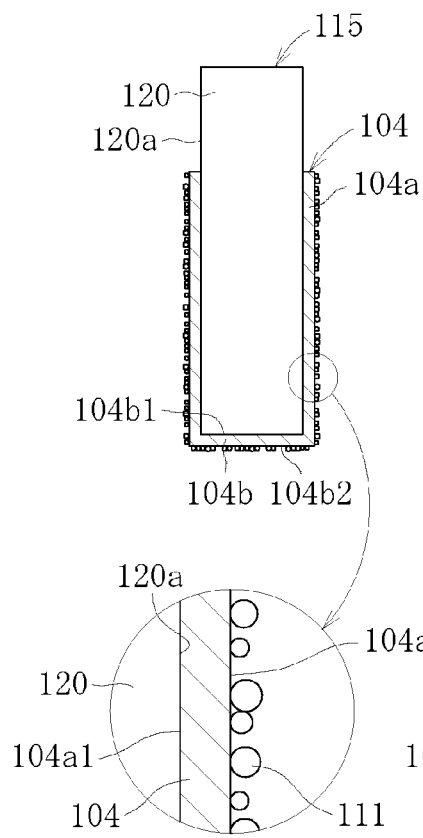
FIG. 10b A sectional view illustrating the electroformed-portion-forming step.
Figure 10C:
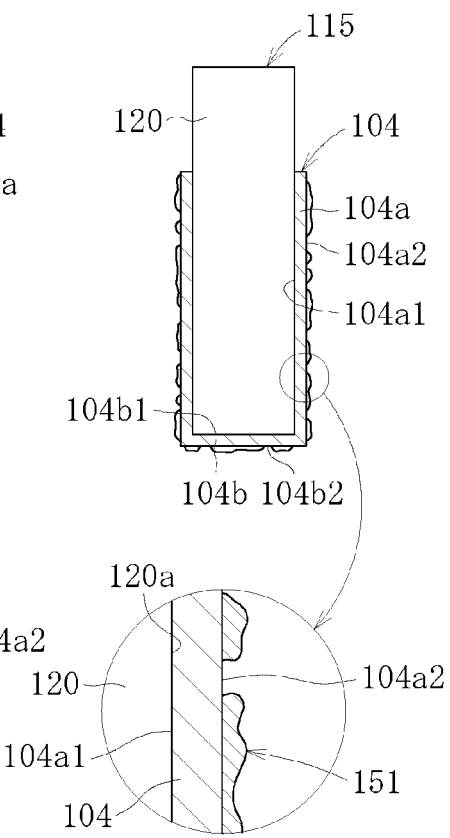
FIG. 10c A sectional view illustrating the electroformed-portion-forming step.
Figure 11:
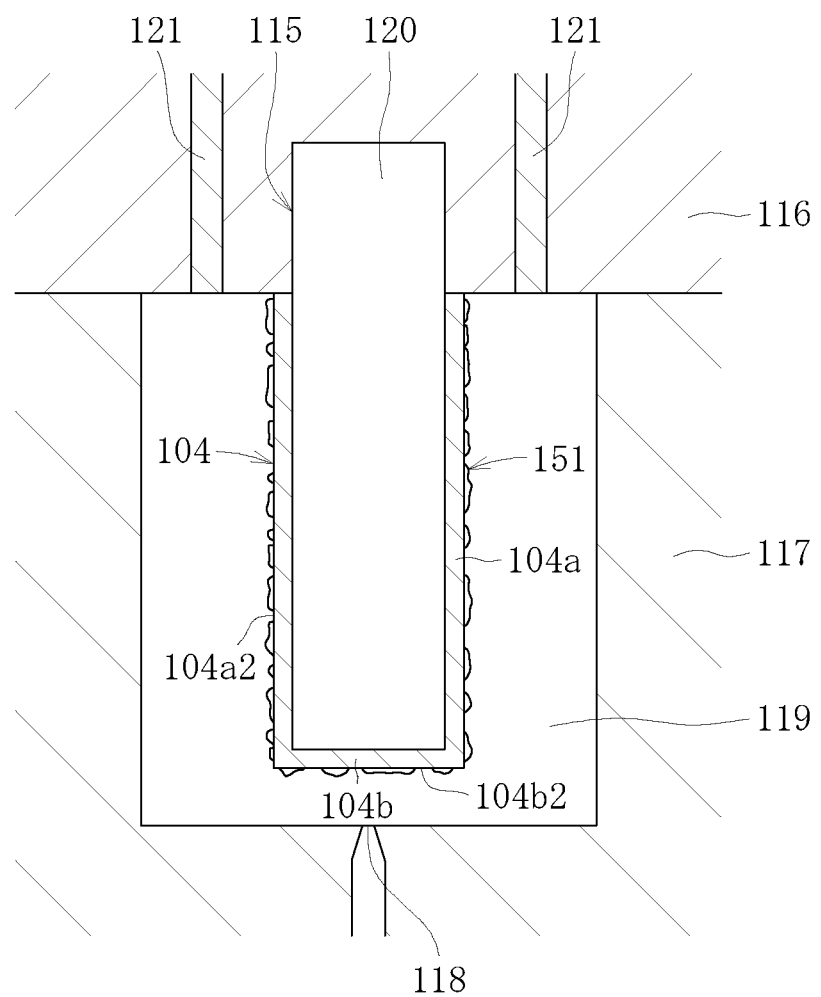
FIG. 11 A sectional view illustrating an injection-molding step.
Figure 12:
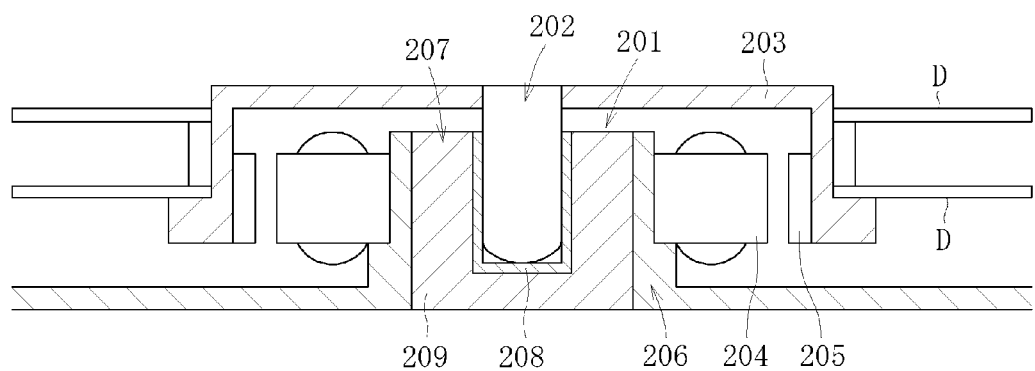
FIG. 12 A sectional view containing a shaft, which conceptually illustrates a spindle motor incorporating a bearing device.
Figure 13:
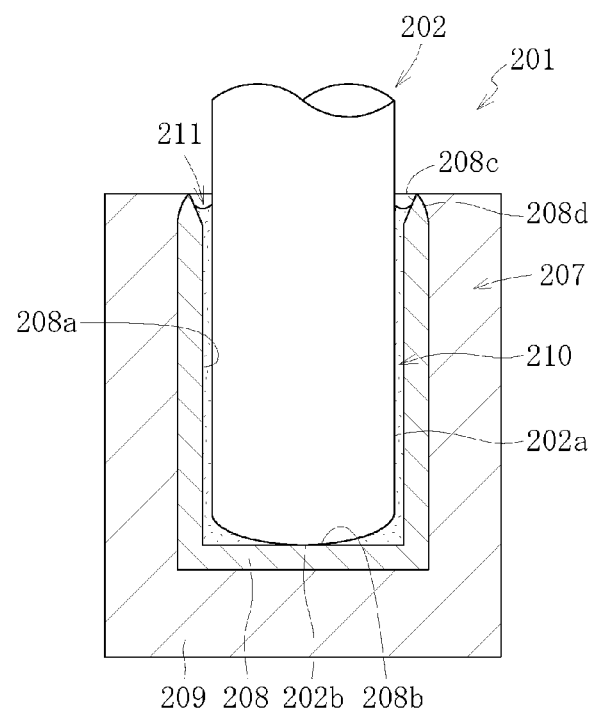
FIG. 13 A sectional view containing a shaft, which conceptually illustrates an embodiment of a bearing device according to the present invention.
Figure 15:
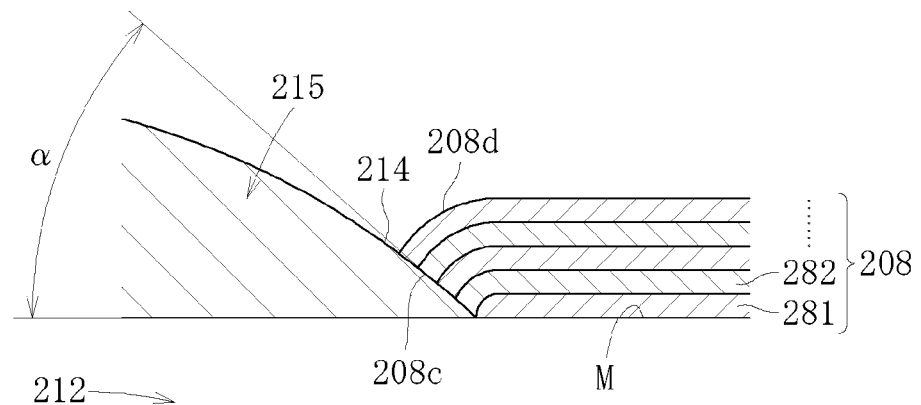
FIG. 15 A main-portion-enlarged sectional view conceptually illustrating an electroforming step.
Figure 16A:
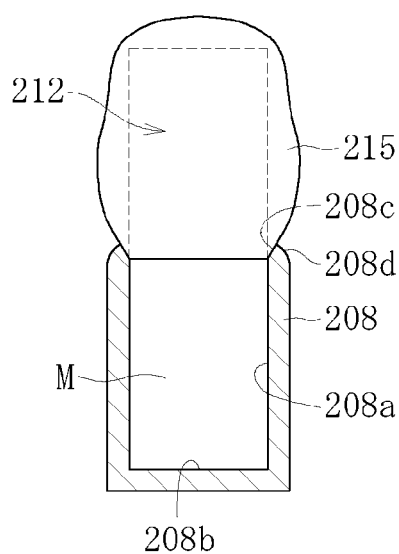
FIG. 16a A view illustrating a state in which an electroformed portion and a masking portion are adhered to the master.
Figure 16B:
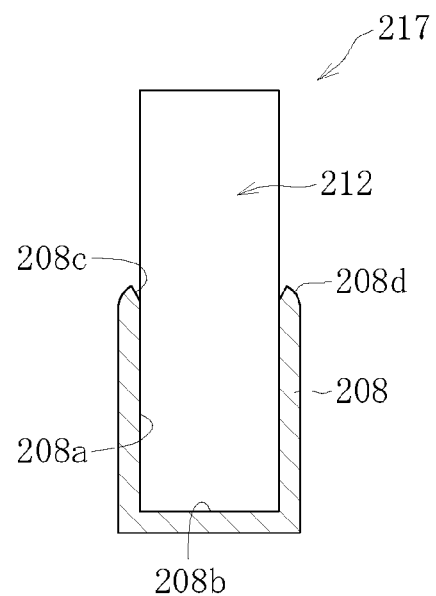
FIG. 16b A view illustrating an electroformed member.
Figure 17:
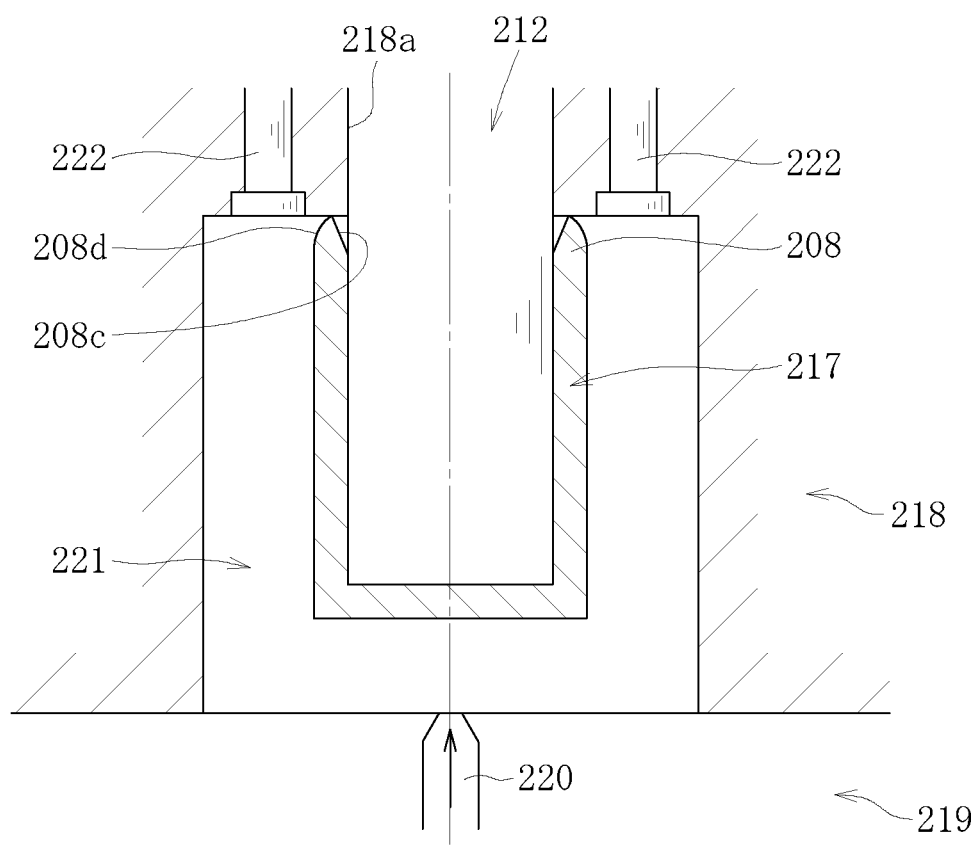
FIG. 17 A sectional view conceptually illustrating an insertion-molding step of a die-molded portion.

DESCRIPTION OF THE SYMBOLS 1 bearing device (electroformed bearing)
2 shaft member
3 bearing member
4 electroformed portion
4c fine particle trace
5 resin portion
50 base portion
60 micro projection
6 fine particle
R1, R2 radial bearing portion
T thrust bearing portion

The invention claimed is:
1. An electroformed bearing, comprising:
a shaft member;

an electroformed portion comprising an inner peripheral surface which is opposed to an outer peripheral surface of the shaft member through a radial bearing clearance; and a resin portion which is injection-molded with the electroformed portion used as an insertion component, wherein the electroformed portion retains fine particles in a dispersed state, and fine particles exposed from a surface coming into contact with the resin portion of the electroformed portion are molten so as to be integrated with the resin portion.

2. An electroformed bearing according to claim 1, wherein the fine particles and the resin portion are made of a same kind of resin.

3. An electroformed bearing according to claim 1, wherein:
the electroformed portion is constituted by a plurality of electroformed layers; and
the fine particles are dispersed in an outermost electroformed layer.

4. A method of manufacturing an electroformed bearing comprising a shaft member, an electroformed portion comprising an inner peripheral surface which is opposed to an outer peripheral surface of the shaft member through a radial bearing clearance, and a resin portion which is injection-molded with the electroformed portion used as an insertion component, the manufacturing method comprising:

depositing the electroformed portion in a solution in which fine particles are dispersed, to thereby form the electroformed portion which retains the fine particles in a dispersed state; and injecting a resin in a cavity in which the electroformed portion is arranged, to thereby melt, by the injected material, the fine particles that are exposed on a surface of the electroformed portion so as to be integrated with the resin portion.

5. An electroformed bearing, comprising:
a shaft member;
an electroformed portion comprising an inner peripheral surface which is opposed to an outer peripheral surface of the shaft member through a radial bearing clearance; and
a resin portion which covers the electroformed portion and is held in close contact with the electroformed portion,
wherein, of the resin portion, a surface coming into contact at least with the electroformed portion is provided with high-adhesion-force portions having an adhesion force with respect to the electroformed portion higher than an adhesion force of other region of the resin portion, and
wherein the high-adhesion-force portions are resin powders melted and adhered to the electroformed portion.

* * * * *